United States Patent
Burks et al.

(10) Patent No.: US 8,290,237 B1
(45) Date of Patent: Oct. 16, 2012

(54) SYSTEMS AND METHODS TO USE A DIGITAL CAMERA TO REMOTELY DEPOSIT A NEGOTIABLE INSTRUMENT

(75) Inventors: Rickey Dale Burks, Boerne, TX (US); Charles Lee Oakes, III, Boerne, TX (US); Randy Ray Morlen, San Antonio, TX (US); Bharat Prasad, San Antonio, TX (US); Michael Frank Morris, San Antonio, TX (US); Xia Hua, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1061 days.

(21) Appl. No.: 11/931,670

(22) Filed: Oct. 31, 2007

(51) Int. Cl.
*G06K 9/00* (2006.01)
(52) U.S. Cl. ............ 382/137; 382/168; 382/293; 705/35
(58) Field of Classification Search .................. 382/137, 382/138, 139, 140, 168, 169, 171, 172, 293; 705/35
See application file for complete search history.

(56) References Cited

U.S. PATENT DOCUMENTS

| | | | |
|---|---|---|---|
| 3,341,820 A | 9/1967 | Grillmeier, Jr. et al. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,433,436 A | 2/1984 | Carnes |

(Continued)

FOREIGN PATENT DOCUMENTS

EP 0 984 410 A1 3/2000

OTHER PUBLICATIONS

"Best practices for producing quality digital image files," *Digital Images Guidelines*, http ://deepblue.lib.umich.edu/bitstream/2027.42/40247/1/Images-Best_Practice.pdf, downloaded 2007, 2 pages.

(Continued)

*Primary Examiner* — Jon Chang
(74) *Attorney, Agent, or Firm* — Brinks Hofer Gilson & Lione

(57) ABSTRACT

To deposit a negotiable instrument electronically, a digital image may be used. Systems and methods are described herein that facilitate the use of a digital camera to provide the digital image. A user may capture an image of a negotiable instrument to create a digital image. The digital image may be compressed and saved as a digital image file. The user may then transmit the digital image file to a financial institution, such as a bank, to deposit funds drawn from the account of the negotiable instrument into the user's account. A financial institution may receive digital image files created by a digital camera from account holders and process a deposit request using the digital image file.

18 Claims, 15 Drawing Sheets

U.S. PATENT DOCUMENTS

| | | |
|---|---|---|
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldston |
| 4,640,413 A | 2/1987 | Kaplan |
| 4,644,144 A | 2/1987 | Chandek |
| 4,722,444 A | 2/1988 | Murphy |
| 4,722,544 A | 2/1988 | Weber |
| 4,727,435 A | 2/1988 | Otani et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,220,501 A | 6/1993 | Lawlor |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell ............ 379/100 |
| 5,419,588 A | 5/1995 | Wood |
| 5,422,467 A | 6/1995 | Graef |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,893,101 A | 4/1999 | Balogh et al. |
| 5,897,625 A | 4/1999 | Gustin |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,012,048 A | 1/2000 | Gustin et al. |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,073,119 A | 6/2000 | Bornemisza-Wahr |
| 6,085,168 A | 7/2000 | Mori |
| 6,097,834 A | 8/2000 | Krouse |
| 6,097,885 A | 8/2000 | Rayner |
| 6,105,865 A | 8/2000 | Hardesty |
| 6,145,738 A | 11/2000 | Stinson et al. |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-Chu |
| 6,450,403 B1 | 9/2002 | Martens |
| 6,464,134 B1 | 10/2002 | Page |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | Mcneal |
| 6,738,496 B1 | 5/2004 | Van Hall |
| 6,742,128 B1 | 5/2004 | Joiner |
| 6,745,186 B1 | 6/2004 | Testa et al. |
| 6,755,340 B1 | 6/2004 | Voss |
| 6,763,226 B1 | 7/2004 | McZeal |

| Patent No. | Date | Inventor | | Patent No. | Date | Inventor |
|---|---|---|---|---|---|---|
| 6,781,962 B1 | 8/2004 | Williams | | 7,403,917 B1 | 7/2008 | Larsen |
| 6,786,398 B1 | 9/2004 | Stinson | | 7,406,198 B2 | 7/2008 | Aoki et al. |
| 6,789,054 B1 | 9/2004 | Makhlouf | | 7,421,107 B2 | 9/2008 | Lugg |
| 6,796,491 B2 | 9/2004 | Nakajima | | 7,421,410 B1 | 9/2008 | Schechtman et al. |
| 6,806,903 B1 | 10/2004 | Okisu et al. | | 7,433,098 B2 | 10/2008 | Klein et al. |
| 6,813,733 B1 | 11/2004 | Li | | 7,437,327 B2 | 10/2008 | Lam |
| 6,829,704 B2 | 12/2004 | Zhang | | 7,440,924 B2 | 10/2008 | Buchanan |
| 6,844,885 B2 | 1/2005 | Anderson | | 7,447,347 B2 | 11/2008 | Weber |
| 6,856,965 B1 | 2/2005 | Stinson | | 7,455,220 B2 | 11/2008 | Phillips |
| 6,863,214 B2 | 3/2005 | Garner et al. | | 7,455,221 B2 | 11/2008 | Sheaffer |
| 6,870,947 B2 | 3/2005 | Kelland | | 7,460,108 B2 | 12/2008 | Tamura |
| 6,883,140 B1 | 4/2005 | Acker | | 7,461,779 B2 | 12/2008 | Ramachandran |
| 6,898,314 B2 * | 5/2005 | Kung et al. ............ 382/180 | | 7,461,780 B2 | 12/2008 | Potts |
| 6,902,105 B2 | 6/2005 | Koakutsu | | 7,471,818 B1 | 12/2008 | Price |
| 6,913,188 B2 | 7/2005 | Wong | | 7,475,040 B2 | 1/2009 | Buchanan |
| 6,931,591 B1 | 8/2005 | Brown | | 7,477,923 B2 | 1/2009 | Wallmark |
| 6,934,719 B2 | 8/2005 | Nally | | 7,480,382 B2 | 1/2009 | Dunbar |
| 6,957,770 B1 | 10/2005 | Robinson | | 7,480,422 B2 | 1/2009 | Ackley et al. |
| 6,961,689 B1 | 11/2005 | Greenberg | | 7,489,953 B2 | 2/2009 | Griffin |
| 6,970,843 B1 | 11/2005 | Forte | | 7,490,242 B2 | 2/2009 | Torres |
| 6,973,589 B2 | 12/2005 | Wright | | 7,497,429 B2 | 3/2009 | Reynders |
| 6,983,886 B2 | 1/2006 | Natsukari et al. | | 7,503,486 B2 | 3/2009 | Ahles |
| 6,993,507 B2 | 1/2006 | Meyer | | 7,505,759 B1 | 3/2009 | Rahman |
| 6,996,263 B2 | 2/2006 | Jones et al. | | 7,506,261 B2 | 3/2009 | Satou |
| 6,999,943 B1 | 2/2006 | Johnson | | 7,509,287 B2 | 3/2009 | Nutahara |
| 7,003,040 B2 | 2/2006 | Yi | | 7,512,564 B1 | 3/2009 | Geer |
| 7,004,382 B2 | 2/2006 | Sandru | | 7,519,560 B2 | 4/2009 | Lam |
| 7,010,155 B2 * | 3/2006 | Koakutsu et al. ......... 382/137 | | 7,520,420 B2 | 4/2009 | Phillips |
| 7,010,507 B1 | 3/2006 | Anderson | | 7,520,422 B1 | 4/2009 | Robinson et al. |
| 7,016,704 B2 | 3/2006 | Pallakoff | | 7,536,354 B1 | 5/2009 | deGroeve et al. |
| 7,039,048 B1 | 5/2006 | Monta | | 7,536,440 B2 | 5/2009 | Budd |
| 7,058,036 B1 | 6/2006 | Yu | | 7,539,646 B2 | 5/2009 | Gilder |
| 7,062,099 B2 | 6/2006 | Li et al. | | 7,540,408 B2 | 6/2009 | Levine |
| 7,062,456 B1 | 6/2006 | Riehl et al. | | 7,542,598 B2 | 6/2009 | Jones |
| 7,062,768 B2 | 6/2006 | Kubo | | 7,545,529 B2 | 6/2009 | Borrey et al. |
| 7,072,862 B1 | 7/2006 | Wilson | | 7,548,641 B2 | 6/2009 | Gilson et al. |
| 7,076,458 B2 | 7/2006 | Lawlor et al. | | 7,566,002 B2 | 7/2009 | Love et al. |
| 7,086,003 B2 | 8/2006 | Demsky | | 7,571,848 B2 | 8/2009 | Cohen |
| 7,092,561 B2 | 8/2006 | Downs, Jr. | | 7,587,066 B2 | 9/2009 | Cordery et al. |
| 7,104,443 B1 | 9/2006 | Paul et al. | | 7,587,363 B2 | 9/2009 | Cataline |
| 7,113,925 B2 | 9/2006 | Waserstein | | 7,590,275 B2 | 9/2009 | Clarke et al. |
| 7,114,649 B2 | 10/2006 | Nelson | | 7,599,543 B2 | 10/2009 | Jones |
| 7,139,594 B2 | 11/2006 | Nagatomo | | 7,599,888 B2 | 10/2009 | Manfre |
| 7,140,539 B1 | 11/2006 | Crews | | 7,602,956 B2 | 10/2009 | Jones |
| 7,163,347 B2 | 1/2007 | Lugg | | 7,606,762 B1 | 10/2009 | Heit |
| 7,178,721 B2 | 2/2007 | Maloney | | 7,609,873 B2 | 10/2009 | Foth |
| 7,181,430 B1 | 2/2007 | Buchanan et al. | | 7,619,721 B2 | 11/2009 | Jones |
| 7,184,980 B2 | 2/2007 | Allen-Rouman et al. | | 7,620,231 B2 | 11/2009 | Jones |
| 7,197,173 B2 | 3/2007 | Jones et al. | | 7,620,604 B1 | 11/2009 | Bueche, Jr. |
| 7,200,255 B2 | 4/2007 | Jones | | 7,644,043 B2 | 1/2010 | Minowa |
| 7,204,412 B2 | 4/2007 | Foss, Jr. | | 7,647,275 B2 | 1/2010 | Jones |
| 7,216,106 B1 | 5/2007 | Buchanan | | 7,668,363 B2 | 2/2010 | Price |
| 7,219,082 B2 | 5/2007 | Forte | | 7,672,940 B2 | 3/2010 | Viola |
| 7,219,831 B2 | 5/2007 | Murata | | 7,676,409 B1 | 3/2010 | Ahmad |
| 7,249,076 B1 | 7/2007 | Pendleton | | 7,680,735 B1 | 3/2010 | Loy |
| 7,252,224 B2 | 8/2007 | Verma | | 7,689,482 B2 | 3/2010 | Lam |
| 7,266,230 B2 | 9/2007 | Doran | | 7,697,776 B2 | 4/2010 | Wu et al. |
| 7,290,034 B2 | 10/2007 | Budd | | 7,698,222 B1 | 4/2010 | Bueche, Jr. |
| 7,299,970 B1 | 11/2007 | Ching | | 7,702,588 B2 | 4/2010 | Gilder et al. |
| 7,299,979 B2 | 11/2007 | Phillips | | 7,734,545 B1 | 6/2010 | Fogliano |
| 7,313,543 B1 | 12/2007 | Crane | | 7,743,979 B2 | 6/2010 | Fredman |
| 7,314,163 B1 | 1/2008 | Crews et al. | | 7,753,268 B1 | 7/2010 | Robinson et al. |
| 7,321,874 B2 | 1/2008 | Dilip | | 7,766,244 B1 | 8/2010 | Field |
| 7,321,875 B2 | 1/2008 | Dilip | | 7,769,650 B2 | 8/2010 | Bleunven |
| 7,325,725 B2 | 2/2008 | Foss, Jr. | | 7,792,752 B1 | 9/2010 | Kay |
| 7,328,190 B2 | 2/2008 | Smith et al. | | 7,792,753 B1 | 9/2010 | Slater et al. |
| 7,330,604 B2 | 2/2008 | Wu et al. | | 7,810,714 B2 | 10/2010 | Murata |
| 7,336,813 B2 * | 2/2008 | Prakash et al. ............ 382/139 | | 7,818,245 B2 | 10/2010 | Prakash et al. |
| 7,343,320 B1 | 3/2008 | Treyz | | 7,856,402 B1 | 12/2010 | Kay |
| 7,349,566 B2 | 3/2008 | Jones et al. | | 7,873,200 B1 * | 1/2011 | Oakes et al. ............ 382/137 |
| 7,356,505 B2 | 4/2008 | March | | 7,876,949 B1 * | 1/2011 | Oakes et al. ............ 382/137 |
| 7,377,425 B1 | 5/2008 | Ma | | 7,885,451 B1 | 2/2011 | Walls et al. |
| 7,379,978 B2 | 5/2008 | Anderson | | 7,885,880 B1 | 2/2011 | Prasad et al. |
| 7,385,631 B2 | 6/2008 | Maeno | | 7,894,094 B2 | 2/2011 | Nacman et al. |
| 7,386,511 B2 | 6/2008 | Buchanan | | 7,896,232 B1 | 3/2011 | Prasad et al. |
| 7,391,897 B2 | 6/2008 | Jones | | 7,900,822 B1 | 3/2011 | Prasad et al. |
| 7,391,934 B2 | 6/2008 | Goodall et al. | | 7,912,785 B1 | 3/2011 | Kay |
| 7,392,935 B2 | 7/2008 | Byrne | | 7,949,587 B1 | 5/2011 | Morris et al. |
| 7,401,048 B2 | 7/2008 | Rosedale | | 7,962,411 B1 | 6/2011 | Prasad et al. |

| Patent/Publication | Date | Inventor |
|---|---|---|
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,046,301 B1 | 10/2011 | Smith et al. |
| 2001/0014881 A1 | 8/2001 | Drummond |
| 2001/0018739 A1 | 8/2001 | Anderson |
| 2001/0027994 A1 | 10/2001 | Hayashida |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta |
| 2002/0171820 A1 | 11/2002 | Okamura |
| 2002/0178112 A1 | 11/2002 | Goeller |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1* | 12/2004 | Murai et al. ................. 382/274 |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1* | 1/2005 | Rahn et al. ................. 600/425 |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097046 A1 | 5/2005 | Singfield |
| 2005/0108164 A1 | 5/2005 | Salafia |
| 2005/0108168 A1 | 5/2005 | Halpin |
| 2005/0115110 A1 | 6/2005 | Dinkins |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Andersson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent et al. |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |

| | | |
|---|---|---|
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |
| 2005/0289182 A1 | 12/2005 | Pandian et al. |
| 2006/0002426 A1 | 1/2006 | Madour |
| 2006/0004660 A1 | 1/2006 | Pranger |
| 2006/0025697 A1 | 2/2006 | Kurzweil |
| 2006/0039628 A1 | 2/2006 | Li et al. |
| 2006/0039629 A1 | 2/2006 | Li |
| 2006/0041506 A1 | 2/2006 | Mason et al. |
| 2006/0045321 A1 | 3/2006 | Yu |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085357 A1 | 4/2006 | Pizarro |
| 2006/0102704 A1 | 5/2006 | Reynders |
| 2006/0106691 A1 | 5/2006 | Sheaffer |
| 2006/0106717 A1 | 5/2006 | Randle |
| 2006/0110063 A1 | 5/2006 | Weiss |
| 2006/0112013 A1* | 5/2006 | Maloney ............... 705/45 |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0144924 A1 | 7/2006 | Stover |
| 2006/0144950 A1 | 7/2006 | Johnson |
| 2006/0161501 A1 | 7/2006 | Waserstein |
| 2006/0164682 A1 | 7/2006 | Lev |
| 2006/0167818 A1 | 7/2006 | Wentker et al. |
| 2006/0182331 A1 | 8/2006 | Gilson et al. |
| 2006/0182332 A1* | 8/2006 | Weber ............... 382/139 |
| 2006/0206506 A1 | 9/2006 | Fitzpatrick |
| 2006/0210138 A1 | 9/2006 | Hilton et al. |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0222260 A1* | 10/2006 | Sambongi et al. ............ 382/274 |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1 | 10/2006 | Peterson |
| 2006/0249567 A1 | 11/2006 | Byrne |
| 2006/0274164 A1 | 12/2006 | Kimura et al. |
| 2006/0279628 A1 | 12/2006 | Fleming |
| 2006/0282383 A1 | 12/2006 | Doran |
| 2006/0291744 A1* | 12/2006 | Ikeda et al. ............... 382/275 |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0031022 A1 | 2/2007 | Frew |
| 2007/0038561 A1 | 2/2007 | Vancini et al. |
| 2007/0041629 A1* | 2/2007 | Prakash et al. ............... 382/139 |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1* | 4/2007 | Carreon et al. ............... 382/137 |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1* | 4/2007 | Foth et al. ............... 382/137 |
| 2007/0086643 A1 | 4/2007 | Spier |
| 2007/0094088 A1 | 4/2007 | Mastie |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0127805 A1 | 6/2007 | Foth et al. |
| 2007/0129955 A1 | 6/2007 | Dalmia |
| 2007/0136198 A1 | 6/2007 | Foth et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0156438 A1 | 7/2007 | Popadic |
| 2007/0168265 A1 | 7/2007 | Rosenberger |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1* | 8/2007 | Questembert ............... 705/39 |
| 2007/0183000 A1 | 8/2007 | Eisen et al. |
| 2007/0194102 A1 | 8/2007 | Cohen |
| 2007/0198432 A1 | 8/2007 | Pitroda et al. |
| 2007/0203708 A1 | 8/2007 | Polcyn et al. |
| 2007/0208816 A1 | 9/2007 | Baldwin et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2008/0002911 A1 | 1/2008 | Eisen |
| 2008/0021802 A1 | 1/2008 | Pendleton |
| 2008/0040280 A1 | 2/2008 | Davis et al. |
| 2008/0052182 A1 | 2/2008 | Marshall |
| 2008/0059376 A1 | 3/2008 | Davis |
| 2008/0063253 A1 | 3/2008 | Wood |
| 2008/0068674 A1 | 3/2008 | McIntyre |
| 2008/0071721 A1 | 3/2008 | Wang |
| 2008/0080760 A1 | 4/2008 | Ronca |
| 2008/0086420 A1 | 4/2008 | Gilder et al. |
| 2008/0086421 A1 | 4/2008 | Gilder |
| 2008/0091599 A1 | 4/2008 | Foss, Jr. |
| 2008/0097899 A1 | 4/2008 | Jackson et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Rathbun |
| 2008/0156438 A1 | 7/2008 | Stumphauzer et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder |
| 2008/0249951 A1 | 10/2008 | Gilder et al. |
| 2008/0262953 A1 | 10/2008 | Anderson |
| 2008/0275821 A1 | 11/2008 | Bishop et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0108080 A1 | 4/2009 | Meyer |
| 2009/0110281 A1 | 4/2009 | Hirabayashi |
| 2009/0141962 A1 | 6/2009 | Borgia et al. |
| 2009/0171819 A1 | 7/2009 | Von der Emde et al. |
| 2009/0171825 A1 | 7/2009 | Roman |
| 2009/0173781 A1 | 7/2009 | Ramachandran |
| 2009/0190823 A1 | 7/2009 | Walters |
| 2009/0192938 A1 | 7/2009 | Amos |
| 2009/0236413 A1 | 9/2009 | Mueller et al. |

| | | | |
|---|---|---|---|
| 2009/0252437 A1 | 10/2009 | Li | |
| 2009/0281904 A1 | 11/2009 | Pharris | |
| 2009/0313167 A1 | 12/2009 | Dujari | |
| 2010/0007899 A1 | 1/2010 | Lay | |
| 2010/0027679 A1 | 2/2010 | Sunahara et al. | |
| 2010/0047000 A1 | 2/2010 | Park et al. | |
| 2010/0057578 A1 | 3/2010 | Blair et al. | |
| 2010/0061446 A1 | 3/2010 | Hands et al. | |
| 2010/0082470 A1 | 4/2010 | Walach | |
| 2010/0165015 A1 | 7/2010 | Barkley et al. | |
| 2010/0260408 A1 | 10/2010 | Prakash et al. | |
| 2010/0262522 A1 | 10/2010 | Anderson et al. | |
| 2010/0312705 A1 | 12/2010 | Caruso et al. | |
| 2011/0112967 A1 | 5/2011 | Anderson et al. | |

OTHER PUBLICATIONS

"Picture this: Check 21 uses digital technology to speed check processing and shorten lag time," Columbus Business First, http://columbus.bizjournals.com/columbus/stories/2005/03/14/focus1.html, downloaded 2007, 3 pages.

"Accept "Customer Not Present" Checks," Accept Check Online, http://checksoftware.com, Cited in patent No. 7,900,822, as dated 2007 (1 pg).

"Adjusting Brightness and Contrast," www.eaglesoftware.com/adjustin.htm, retrieved on May 4, 2009 (4 pages).

"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).

"Check 21—The check is not in the post", RedTitan Technology 2004 http://www.redtitan.com/check21/htm (3 pgs).

"Check 21 Solutions," Columbia Financial International, Inc. http://www.columbiafinancial.us/check21/solutions.htm, Cited in patent No. 7,900,822, as dated 2007 (8 pgs).

"Check Fraud: A Guide to Avoiding Losses", All Net, http://all.net/books/audit/checkfraud/security.htm, Cited in patent No. 7,900,822, as dated 2007 (1 pg).

"Compliance with Regulation CC", http./www/federalreserve.gov/Pubs/regcc/regcc.htm, Jan. 24, 2006 (6 pgs).

"Customer Personalized Bank Checks and Address Labels" Checks Your Way Inc., http://www.checksyourway.com/htm/web_pages/faq.htm, Cited in patent No. 7,900,822, as dated 2007 (6 pgs).

"Direct Deposit Application for Payroll", Purdue University, Business Office Form 0003, http://purdue.edu/payroll/pdf/directdepositapplication.pdf, Jul. 2007 (2 pgs).

"Direct Deposit Authorization Form", www.umass.edu/humres/library/DDForm.pdf, May 2003 (3 pgs).

"Direct Deposit," University of Washington, http://www.washington.edu/admin/payroll/directdeposit.html, Cited in patent No. 7,900,822, as dated 2007 (3 pgs).

"Electronic Billing Problem: The E-check is in the mail" American Banker—vol. 168, No. 95, May 19, 2003 (4 pgs).

"Frequently Asked Questions" Bank of America, http://www/bankofamerica.com/deposits/checksave/index.cfm?template-lc_faq_bymail, Cited in patent No. 7,900,822, as dated 2007 (2 pgs).

"Full Service Direct Deposit", www.nonprofitstaffing.com/images/upload/dirdepform.pdf. Cited in patent No. 7,900,822, as dated 2001, (2 pgs).

"How to Digitally Deposit a Check Image," Smart Money Daily, Copyright 2008 (5 pgs).

"ImageNet Mobile Deposit Provides Convenient Check Deposit and Bill Pay to Mobile Consumers," Miteksystems, 2008 (2 pgs).

"It's the easiest way to Switch banks", LNB, http://www.inbky.com/pdf/LNBswitch-kit10-07.pdf Cited in patent No. 7,996,316, as dated 2007 (7 pgs).

"Lesson 38—More Bank Transactions", Turtle Soft, http://www.turtlesoft.com/goldenseal-software-manual.lesson38.htm, Cited in patent No. 7,900,822, as dated 2007 (8 pgs).

"Middleware", David E. Bakken, Encyclopedia of Distributed Computing, Kluwer Academic Press, 2001 (6 pgs).

"Mitek Systems Announces Mobile Deposit Application for Apple iPhone," http://prnewswire.com/cgi-bin/stories/pl?ACCT=104&STORY=/www/story/10-01- . . . , Nov. 25, 2008, pp. 1-2.

"Personal Finance", PNC, http://www.pnc.com/webapp/unsec/productsandservice.do?sitearea=/PNC/home/personal/account+services/quick+switch/quick+switch+faqs, Cited in patent No. 7,900,822, as dated 2007 (12 pgs).

"Refractive index" Wikipedia, the free encyclopedia; http://en.wikipedia.org./wiki/refractiveindex.com Oct. 16, 2007 (4 pgs).

"Remote Deposit Capture", Plante & Moran, http://plantemoran.com/industries/fincial/institutions/bank/resources/community+bank+advisor/2007+summer+issue/remote+deposit+capture.htm, Cited in patent No. 7,900,822, as dated 2007 (3 pgs).

"Remote Deposit" National City, http://www.nationalcity.com/smallbusiness/cashmanagement/remotedeposit/default.asp; Cited in patent No. 7,900,822, as dated 2007 (1 pg).

"Save on ATM Fees", RedEye Edition, Chicago Tribune, Chicago, IL Jun. 30, 2007 (2 pgs).

"Switching Made Easy," Bank of North Georgia, http://www.banknorthgeorgia.com/cmsmaster/documents/286/documents616.pdf, 2007 (7 pgs).

"Two Words Every Business Should Know: Remote Deposit," Canon, http://www.rpsolutions.com/rpweb/pdfs/canon_rdc.pdf, 2005 (7 pgs).

"Virtual Bank Checks", Morebusiness.com, http://www.morebusiness.com/running_yourbusiness/businessbits/d908484987.brc, Cited in patent No. 7,900,822, as dated 2007 (3 pgs).

"WallStreetGrapevine.com" Stocks on the Rise: JADG, BKYI, MITK; Mar. 3, 2008 (4 pgs).

"What is check Fraud", National Check Fraud Center, http://www.ckfraud.org/ckfraud.html , Cited in patent No. 7,900,822, as dated 2007 (12 pgs).

Affinity Federal Credit Union, "Affinity Announces Online Deposit," Aug. 4, 2005 (1 pg).

Albrecht, W. Steve, "Check Kiting: Detection, Prosecution and Prevention," The FBI Law Enforcement Bulletin, Nov. 1, 1993. (6 pgs).

Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).

Anderson, Milton M. "FSML and Echeck", Financial Services Technology Consortium, 1999 (17 pgs).

Archive Index Systems; Panini My Vision X-30 or VX30 or X30 © 1994-2008 Archive Systems, Inc. P./O. Box 40135 Bellevue, WA USA 98015 (2 pgs).

Associate of German Banks, SEPA 2008: Uniform Payment Instruments for Europe, Berlin, Cited in patent No. 7,900,822, as dated Jul. 2007, Bundesverbankd deutscher banker ev (42 pgs).

Automated Merchant Systems, Inc., "Electronic Check Conversion," http://www.automatedmerchant.com/electronic_check_conversion.cfm, 2006, downloaded Oct. 18, 2006 (3 pgs).

Bank Systems & Technology, Untitled Article. http://www.banktech.com/showarticle.jhtml? articleID=187003126, "Are you Winning in the Payment World?" dated May 1, 2006, (4 pgs).

BankServ, "DepositNow: What's the difference?" Cited in patent No. 7,970,677, as dated 2006, (4 pgs).

BankServ, Product Overview, http://www.bankserv.com/products/remotedeposit.htm, Cited in patent No. 7,970,677, as dated 2006, (3 pgs).

Blafore, Bonnie "Lower Commissions, Fewer Amenities", Better Investing, Madison Heights: Feb. 2003, vol. 52, Iss 6, (4 pgs).

BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 18, 2008 (5pgs).

Blue Mountain Consulting, from URL: www.bluemontainconsulting.com, Cited in patent No. 7,900,822, as dated Apr. 26, 2006 (3 pgs).

Board of Governors of the federal reserve system, "Report to the Congress on the Check Clearing for the 21$^{st}$ Century Act of 2003", Submitted to Congress pursuant to section 16 of the Check Clearing for the 21$^{st}$ Century Act of 2003, dated Apr. 2007, (59 pgs).

Bruene, Jim; "Check Free to Enable In-Home Remote Check Deposit for Consumers and Small Business", NetBanker. Com, Financial- Insite, Inc., http://www.netbanker.com/2008/02/checkfree_to_enablejnhome_rem.html, Feb. 5, 2008 (3 pgs).

Bruene, Jim; "Digital Federal Credit Union and Four Others Offer Consumer Remote Deposit Capture Through EasCorp", NetBanker—Tracking Online Finance, www.netbanker.com/2008/04/diqital federal credit union a. html, Apr. 13, 2008 (3 pgs).

Burnett, J. "Depository Bank Endorsement Requirements," BankersOnline.com, http://www.bankersonline.com/cgi-bin/printview/printview.pl, Jan. 6, 2003 (3 pgs).

Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).

Century Remote Deposit High-Speed Scanner User's Manual Release, 2006 (Century Manual) (32 pgs).

Chiang, Chuck, The Bulletin, "Remote banking offered", http://bendbulletin.com/apps/pbcs.dll/article?AID=/20060201/BIZ0102/602010327&templ . . . , dated Feb. 1, 2006, (2 pgs).

CNN.com/technology, "Scan, deposit checks from home", www.cnn.com/2008ITECH/biztech/02/07/check.scanning.ap/index.html, Feb. 7, 2008 (3 pgs).

Constanzo, Chris, "Remote Check Deposit: Wells Captures a New Checking Twist", Bank Technology News Article—May 2005, www.americanbankercom/btn_article.html?id=20050502YQ50FSYG (2 pgs).

Craig, Ben, "Resisting Electronic Payment Systems: Burning Down the House?", Federal Reserve Bank of Cleveland, Jul. 1999 (4 pgs).

Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).

Credit Union Journal, "The Ramifications of Remote Deposit Capture Success", www.cuiournal.com/orintthis.html?id=20080411EODZT57G, Apr. 14, 2008 (1 pg).

Credit Union Journal, "AFCU Averaging 80 DepositHome Transactions Per Day", Credit Union Journal, Aug. 15, 2005 (1 pg).

DCU Member's Monthly—Jan. 2008, "PC Deposit—Deposit Checks from Home!", http://www.mycreditunionnewsletter.com/dcu/01 08/page1. html, Copyright 2008 Digital Federal Credit Union (2 pgs).

De Queiroz, Ricardo et al., "Mixed Raster Content (MRC) Model for Compound Image Compression", 1998 (14 pgs).

Debello, James et al., "RDM and Mitek Systems to Provide Mobile Check Deposit," Mitek Systems, Inc., San Diego, California and Waterloo, Ontario, (Feb. 24, 2009) (2 pgs).

DeYoung, Robert; "The Financial Performance of Pure Play Internet Banks"; Federal Reserve Bank of Chicago Economic Perspectives; 2001; pp. 60-75; vol. 25, No. 1 (16 pgs).

Dias, Danilo et al., "A Model for the Electronic Representation of Bank Checks", Brasilia Univ. Oct. 2006 (5 pgs).

Digital Transactions News, "An ACH-Image Proposal for Check Roils Banks and Networks" May 26, 2006 (3 pgs).

Dinan, R.F. et al., "Image Plus High Performance Transaction System", IBM Systems Journal, 1990 vol. 29, No. 3 (14 pgs).

eCU Technologies, "Upost Remote Deposit Solution," Retrieved from the internet https://www.eutechnologies.com/products/upost.html, downloaded 2009 (1 pg).

ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).

Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in patent No. 7,873,200, as dated Dec. 2005 (20 pgs).

Federal Reserve Board, "Check Clearing for the 21st Century Act", FRB, http://www.federalreserve.gov/paymentsystems/truncation/, Mar. 1, 2006 (1 pg).

Fest, Glen., "Patently Unaware" Bank Technology News, Apr. 2006, Retrieved from the internet at URL:http://banktechnews.com/article.html?id=2006403T7612618 (5 pgs).

Fisher, Dan M., "Home Banking in the 21st Century: Remote Capture Has Gone Retail", May 2008 (4 pgs).

Furst, Karen et al., "Internet Banking: Developments and Prospects", Economic and Policy Analysis Working Paper 2000-9, Sep. 2000 (60 pgs).

German Shegalov, Diplom-Informatiker, "Integrated Data, Message, and Process Recovery for Failure Masking in Web Services", Dissertation Jul. 2005 (146 pgs).

Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).

Gupta, Maya R. et al., "OCR binarization and image pre-processing for searching historical documents," Pattern Recognition, vol. 40, No. 2, Feb. 2007, pp. 389-397.

Hartly, Thomas, "Banks Check Out New Image", Business First, Buffalo: Jul. 19, 2004, vol. 20, Issue 43, (3 pgs).

Heckenberg, D. "Using Mac OS X for Real-Time Image Processing" Oct. 8, 2003 (15 pgs).

Hildebrad, C. et al., "Electronic Money," Oracle, http://www.oracle.com/oramag/profit/05-feb/p15financial.html, 2005, downloaded Oct. 18, 2006 (5 pgs).

Hillebrand, G., "Questions and Answers About the Check Clearing for the 21st Century Act, Check 21," ConsumersUnion.org, http://www.consumersunion.org/finance/ckclear1002.htm, Jul. 27, 2004, downloaded Oct. 18, 2006 (6 pgs).

Image Master, "Photo Restoration: We specialize in digital photo restoration and photograph repair of family pictures", http://www.imphotorepair.com, Cited in patent No. 7,900,822, as downloaded Apr. 2007 (1 pg).

JBC: "What is a MICR Line," eHow.com, as downloaded May 4, 2009, (2 pgs).

Johnson, Jennifer J., Secretary of the Board; Federal Reserve System, 12 CFR Part 229, Regulation CC; "Availability of Funds and Collection of Checks". Cited in patent No. 7,900,822, as dated 2009, (89 pgs).

Kendrick, Kevin B., "Check Kidting, Float for Purposes of Profit," Bank Security & Fraud Prevention, vol. 1, No. 2, 1994 (3 pgs).

Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).

Knestout, Brian P. et al., "Banking Made Easy" Kiplinger's Personal Finance Washington, Jul. 2003, vol. 57, Iss 7 (5 pgs).

Kornai Andras et al., "Recognition of Cursive Writing on Personal Checks", Proceedings of International Workshop on the Frontiers in Handwritting Recognition, Cited in patent No. 7,900,822, as dated Sep. 1996, (6 pgs).

Levitin, Adam J., Remote Deposit Capture: A Legal and Transactional Overview, Banking Law Journal, p. 115, 2009 (RDC) (8 pgs).

Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).

Matthews, Deborah, "Advanced Technology Makes Remote Deposit Capture Less Risky," Indiana Bankers Association, Apr. 2008 (2 pgs).

Metro 1 Credit Union, "Remote Banking Services," hltp://ww\\i.metro1cu.org/metro1cu/remote.html, downloaded Apr. 17, 2007 (4 pgs).

Mitek systems, "Imagenet Mobile Deposit", San Diego, CA, downloaded 2009 (2 pgs).

Mitek Systems: Mitek Systems Launches First Mobile Check Deposit and Bill Pay Application, San Diego, CA, Jan. 22, 2008 (3 pgs).

Mohl, Bruce, "Banks Reimbursing ATM Fee to Compete With Larger Rivals", Boston Globe, Boston, MA, Sep. 19, 2004 (3 pgs).

Nelson, B. et al., "Remote deposit capture changes the retail landscape," Northwestern Financial Review, http://findarticles.com/p/articles/mi qa3799/is 200607/ai_n16537250, 2006 (3 pgs).

NetDeposit Awarded Two Patents for Electronic Check Process, Jun. 18, 2007 (NetDeposit) (1 pg).

Nixon, Julie et al., "Fisery Research Finds Banks are Interested in Offering Mobile Deposit Capture as an," Fiserv, Inc. Brookfield, Wis., (Business Wire), (Feb. 20, 2009) (2 pgs).

Online Deposit: Frequently Asked Questions, http://www.depositnow.com/faq.html, Copyright 2008 (1 pg).

Onlinecheck.com/Merchant Advisors, "Real-Time Check Debit", Merchant Advisors: Retail Check Processing Check Conversion, http://www.onlinecheck/wach/rcareal.htm, Cited in patent No. 7,900,822, as dated 2006 (2 pgs).

Oxley, Michael G., from committee on Financial Services; "Check Clearing for the 21st Century Act", 108th Congress, 1st Session House of Representatives report 108-132, Jun. 2003 (20 pgs).

Oxley, Michael G., from the committee of conference; "Check Clearing for the 21st Century Act" 108th Congress, 1st Session Senate report 108-291, Oct. 1, 2003 (27 pgs).

Palacios, Rafael et al., "Automatic Processing of Brazilian Bank Checks". Cited in patent No. 7,900,822, as dated 2002 (28 pgs).

Patterson, Scott "USAA Deposit@Home—Another WOW moment for Net Banking", NextCU.com, Jan. 26, 2007 (5 pgs).

Public Law 108-100, 108 Congress; "An Act Check Clearing for the 21st Century Act", Oct. 28, 2003, 117 STAT. 1177 (18 pgs).

Rao, Bharat; "The Internet and the Revolution in Distribution: A Cross-Industry Examination"; Technology in Society; 1999; pp. 287-306; vol. 21, No. 3 (20 pgs).

Remotedepositcapture, URL:www.remotedepositcapture.com, Cited in patent No. 7,900,822, as dated 2006 (5 pgs).

RemoteDepositCapture.com, "PNC Bank to Offer Ease of Online Deposit Service Integrated with QuickBooks to Small Businesses", Remote Deposit Capture News Articles from Jul. 24, 2006, (2 pgs).

RemoteDepositeCapture.com, Remote Deposit Capture News Articles from Jul. 6, 2006, "BankServ Announces New Remote Deposit Product Integrated with QuickBooks" (3 pgs).

Remotedepositcapture.com, LLC, "Remote Deposit Capture Overview," ROC Overview, http://remotedepositcapture.com/overview/RDC_overview.htm, Cited in patent No. 7,900,822, as dated Mar. 12, 2007 (4 pgs).

Ritzer, J.R. "Hinky Dinky helped spearhead POS, remote banking movement", Bank Systems and Equipment, vol. 21, No. 12, Dec. 1984 (1 pg).

Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).

Rose, Sarah et al., "Best of the We: The Top 50 Financial Websites", Money, New York, Dec. 1999, vol. 28, Iss. 12 (8 pgs).

Shelby, Hon. Richard C. (Committee on Banking, Housing and Urban Affairs); "Check Trunsation Act of 2003"; calendar No. 168, 108th Congress, 1st Session Senate report 108-79, Jun. 2003 (27 pgs).

Thailandguru.com: How and where to Pay Bills @ www.thailandguru.com/paying-bills.html, as downloaded Nov. 16, 2010, (2 pgs).

The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in patent No. 7,900,822, as dated Dec. 2005 (3 pgs).

The Green Sheet 2.0: Newswire, "CO-OP adds home deposit capabilities to suite of check imaging products", www.greensheet.com/newswire.php?newswire_id=8799, Mar. 5, 2008 (2 pgs).

Tygar, J.D., Atomicity in Electronic Commerce, In ACM Networker, 2:2, Apr./May 1998 (12 pgs).

Valentine, Lisa, "Remote Deposit Capture Hot Just Got Hotter," ABA Banking Journal, Mar. 2006, p. 1-9.

Wade, Will, "Early Notes: Updating Consumers on Check 21" American Banker Aug. 10, 2004 (3 pgs).

Walliston, Peter J., "Wal-Mart Case Exposes Flaws in Banking-Commerce Split", American Banker, vol. 167. No. 8, Jan. 11, 2002 (3 pgs).

Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).

Wells Fargo Commercial, "Remote Deposit", www.wellsfargo.com/com/treasury mgmtlreceivables/electronic/remote deposit, Copyright 2008 (1 pg).

White, J.M. et al., "Image Thresholding for Optical Character Recognition and Other Applications Requiring Character Image Extraction", IBM J. RES. Development, Jul. 1983, vol. 27, No. 4 (12 pgs).

Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pgs).

Wikipedia ®, "Remote Deposit," http://en.wikipedia.org/wiki/Remote_deposit, 2007 (3 pgs).

Windowsfordevices.com, "Software lets camera phone users deposit checks, pay bills", www.windowsfordevices.com/news/NS3934956670.html, Jan. 29, 2008 (3 pgs).

Woody Baird Associated Press, "Pastors Wife got Scammed—She Apparently Fell for Overseas Money Scheme," The Commercial Appeal, Jul. 1, 2006, p. A. 1.

Zhang, C.Y., "Robust Estimation and Image Combining" Astronomical Data Analysis Software and Systems IV, ASP Conference Series, 1995 (5 pgs).

Zions Bancorporation, "Moneytech, the technology of money in our world: Remote Deposit," http://www.bankjunior.com/pground/moneytech/remote_deposit.jsp, 2007 (2 pgs).

Office Action from corresponding U.S. Appl. No. 11/931,945 dated Apr. 1, 2011 (18 pgs).

Office Action from corresponding U.S. Appl. No. 11/931,804 dated Apr. 5, 2011 (15 pgs).

Final Office Action from corresponding U.S. Appl. No. 11/931,804 dated Jan. 4, 2012 (14 pgs).

Amber Avalona-Butler / Paraglide, "At Your Service: Best iPhone Apps for Military Lifestyle," Jul. 9, 2010 (2 pgs).

Bruno, M., "Instant Messaging," Bank Technology News, Dec. 2002 (3 pgs).

Carrubba, P. et al., "Remote Deposit Capture: A White Paper Addressing Regulatory, Operational and Risk Issues," NetDeposit Inc., 2006 (11 pgs).

De Jesus, A. et al., "Distributed Check Processing in a Check 21 Environment: An educational overview of the opportunities and challenges associated with implementing distributed check imaging and processing solutions," Panini, 2004, pp. 1-22.

EFT Network Unveils FAXTellerPlus, EFT Network, Inc., www.eftnetwork.com, Jan. 13, 2009 (2 pgs).

Federal Reserve System, "12 CFR, Part 229 [Regulation CC; Docket No. R-0926]: Availability of Funds and Collection of Checks," Federal Registrar, Apr. 28, 1997, pp. 1-50.

Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.

Fidelity Information Services, "Strategic Vision Embraces Major Changes in Financial Services Solutions: Fidelity's long-term product strategy ushers in new era of application design and processing," Insight, 2004, pp. 1-14.

Garry, M., "Checking Options: Retailers face an evolving landscape for electronic check processing that will require them to choose among several scenarios," Supermarket News, vol. 53, No. 49, 2005 (3 pgs).

Investment Systems Company, "Portfolio Accounting System," 2000, pp. 1-32.

Moreau, T., "Payment by Authenticated Facsimile Transmission: a Check Replacement Technology for Small and Medium Enterprises," Connotech Experts-conseils, Inc., Apr. 1995 (31 pgs).

NetBank, Inc., "Branch Out: Annual Report 2004," 2004 (150 pgs).

NetBank, Inc., "Quick Post: Deposit and Payment Forwarding Service," 2005 (1 pg).

Richey, J. C. et al., "EE 4530 Check Imaging," Nov. 18, 2008 (10 pgs).

SoyBank Anywhere, "Consumer Internet Banking Service Agreement," Dec. 6, 2004 (6 pgs).

Teixeira, D., "Comment: Time to Overhaul Deposit Processing Systems," American Banker, Dec. 10, 1998, vol. 163, No. 235, p. 15 (3 pgs).

Wolfe, Daniel, "Check Image Group Outlines Agenda," American Banker, New York, N.Y.: Feb 13, 2009, vol. 174, Iss. 30, p. 12. (2 pgs).

Application as filed on Apr. 3, 2008 for U.S. Appl. No. 12/062,143 (27 pgs).

Application as filed on Aug. 19, 2010 for U.S. Appl. No. 12/859,741 (235 pgs).

Application as filed on Aug. 21, 2008 for U.S. Appl. No. 12/195,723 (38 pgs).
Application as filed on Aug. 21, 2009 for U.S. Appl. No. 12/545,127 (45 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).
Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Feb. 18, 2009 for U.S. Appl. No. 12/388,005 (37 pgs).
Application as filed on Jul. 13, 2006 for U.S. Appl. No. 11/487,537 (23 pgs).
Application as filed on Jul. 27, 2009 for U.S. Appl. No. 12/509,613 (48 pgs).
Application as filed on Jul. 27, 2009 for U.S. Appl. No. 12/509,680 (41 pgs).
Application as filed on Jun. 11, 2008 for U.S. Appl. No. 12/137,051 (29 pgs).
Application as filed on Jun. 8, 2011 for U.S. Appl. No. 13/155,976 (352 pgs).
Application as filed on Jun. 8, 2011 for U.S. Appl. No. 13/156,007 (356 pgs).
Application as filed on Jun. 8, 2011 for U.S. Appl. No. 13/156,018 (353 pgs).
Application as filed on Mar. 15, 2007 for U.S. Appl. No. 11/686,924 (34 pgs).
Application as filed on Mar. 15, 2007 for U.S. Appl. No. 11/686,928 (36 pgs).
Application as filed on Mar. 4, 2009 for U.S. Appl. No. 12/397,671 (40 pgs).
Application as filed on Mar. 4, 2009 for U.S. Appl. No. 12/397,930 (37 pgs).
Application as filed on May 10, 2007 for U.S. Appl. No. 11/747,222 (35 pgs).
Application as filed on Oct. 17, 2008 for U.S. Appl. No. 12/253,278 (42 pgs).
Application as filed on Oct. 23, 2007 for U.S. Appl. No. 11/876,925 (36 pgs).
Application as filed on Oct. 23, 2007 for U.S. Appl. No. 11/877,335 (29 pgs).
Application as filed on Oct. 25, 2007 for U.S. Appl. No. 11/923,839 (22 pgs).
Application as filed on Oct. 29, 2007 for U.S. Appl. No. 11/926,388 (23 pgs).
Application as filed on Oct. 30, 2007 for U.S. Appl. No. 11/928,297 (26 pgs).
Application as filed on Oct. 31, 2006 for U.S. Appl. No. 11/590,974 (31 pgs).
Application as filed on Oct. 31, 2006 for U.S. Appl. No. 11/591,008 (27 pgs).
Application as filed on Oct. 31, 2006 for U.S. Appl. No. 11/591,227 (58 pgs).
Application as filed on Oct. 31, 2006 for U.S. Appl. No. 11/591,273 (56 pgs).
Application as filed on Oct. 31, 2007 for U.S. Appl. No. 11/930,537 (27 pgs).
Application as filed on Oct. 8, 2007 for U.S. Appl. No. 11/868,884 (30 pgs).
Application as filed on Sep. 28, 2007 for U.S. Appl. No. 11/864,569 (35 pgs).
Application as filed on Sep. 8, 2008 for U.S. Appl. No. 12/205,996 (30 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Aug. 19, 2010 for U.S. Appl. No. 12/859,752 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 8, 2010 for U.S. Appl. No. 12/963,513 (7 pgs).
Claims as filed on Feb. 16, 2011 for U.S. Appl. No. 13/028,477 (3 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Mar. 15, 2007 for U.S. Appl. No. 11/686,925 (5 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Notice of Allowance from corresponding U.S. Appl. No. 11/931,804 dated Jun. 22, 2012 (9 pgs).
Application as filed on Feb. 15, 2012 for U.S. Appl. No. 13/397,405 (19 pgs).
Claims as filed on Feb. 15, 2012 for U.S. Appl. No. 13/397,437 (6 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).

* cited by examiner

SYSTEMS AND METHODS TO USE A DIGITAL CAMERA TO REMOTELY DEPOSIT A NEGOTIABLE INSTRUMENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2007 USAA.

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 11/931,804, and U.S. patent application Ser. No. 11/931,945, each filed on Oct. 31, 2007 and each entitled "Systems and Methods to Use a Digital Camera to Remotely Deposit a Negotiable Instrument."

BACKGROUND

Upon the passage of the Check Clearing for the 21st Century Act (Check 21), the use of digital images for check presentment has increased dramatically, as the process typically reduces the time necessary for a check to clear and the cost associated with moving paper checks from location to location. In lieu of using a physical check to clear the check clearinghouse, a scanned image is used in the process. A person, such as a bank teller, scans the physical check upon presentment by a customer at a bank. The scan creates a digital image of the check. The digital image, along with other electronic information such as amount and account holder, is submitted electronically to the federal check clearinghouse system. The system processes the digital image of the check rather than processing the physical check itself.

Banks and other institutions that may process checks have realized significant benefits by using electronic presentment of checks. Along with the reduction of the need to transport paper from the bank of presentment to the federal clearinghouse, a reduction in the processing time has also been realized. At issue when presenting checks electronically is the type of equipment available for use by the depositor and the communication capabilities of the depositor at the time of deposit. For example, a user that wishes to deposit a check by scanning the check and creating a digital image of the check may not have a scanner available for use. Even if a scanner is available for use, the user may not be able to configure their computer system to communicate information to a bank to deposit the check. Thus, the user may not be able to deposit a check, or other type of negotiable instrument, into their account.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, the present subject matter addresses the shortcomings of the prior art and provides for additional benefits through the use of a digital camera to capture a digital image of the negotiable instrument, such as a check, for processing a deposit transaction. The digital camera may be used in lieu of a scanner for capturing an image of the negotiable instrument. The image may be modified to compensate for sub-optimal images. In one exemplary and non-limiting embodiment, a method for depositing funds of a negotiable instrument comprises taking a digital picture of the negotiable instrument, wherein a digital camera is used to take the digital picture. The digital camera then creates a digital image file containing the digital picture. The digital image file is then transmitted along with a request to deposit funds of the negotiable instrument.

In another exemplary and non-limiting embodiment, a method of depositing funds of a negotiable instrument comprises receiving a request to deposit funds of the negotiable instrument and receiving a digital image file of the negotiable instrument. The digital image file comprises a digital image of the negotiable instrument created using a digital camera. The funds from the negotiable instrument are then deposited. Another exemplary and non-limiting embodiment for extracting negotiable instrument information to deposit funds of the negotiable instrument comprises taking a picture of the negotiable instrument using a digital camera to create a digital image and then determining if the digital image is acceptable for use. Information is extracted from the digital image. A communication pathway is opened with a financial institution and the extracted information is transmitted along with the digital image and a request to deposit funds of the negotiable instrument.

Other features of the subject matter are described below.

BRIEF DESCRIPTION OF THE DRAWINGS

The foregoing summary, as well as the following detailed description of the subject matter is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

Certain specific details are set forth in the following description and figures to provide a thorough understanding of various embodiments of the subject matter. Certain well-known details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

Figure 1:
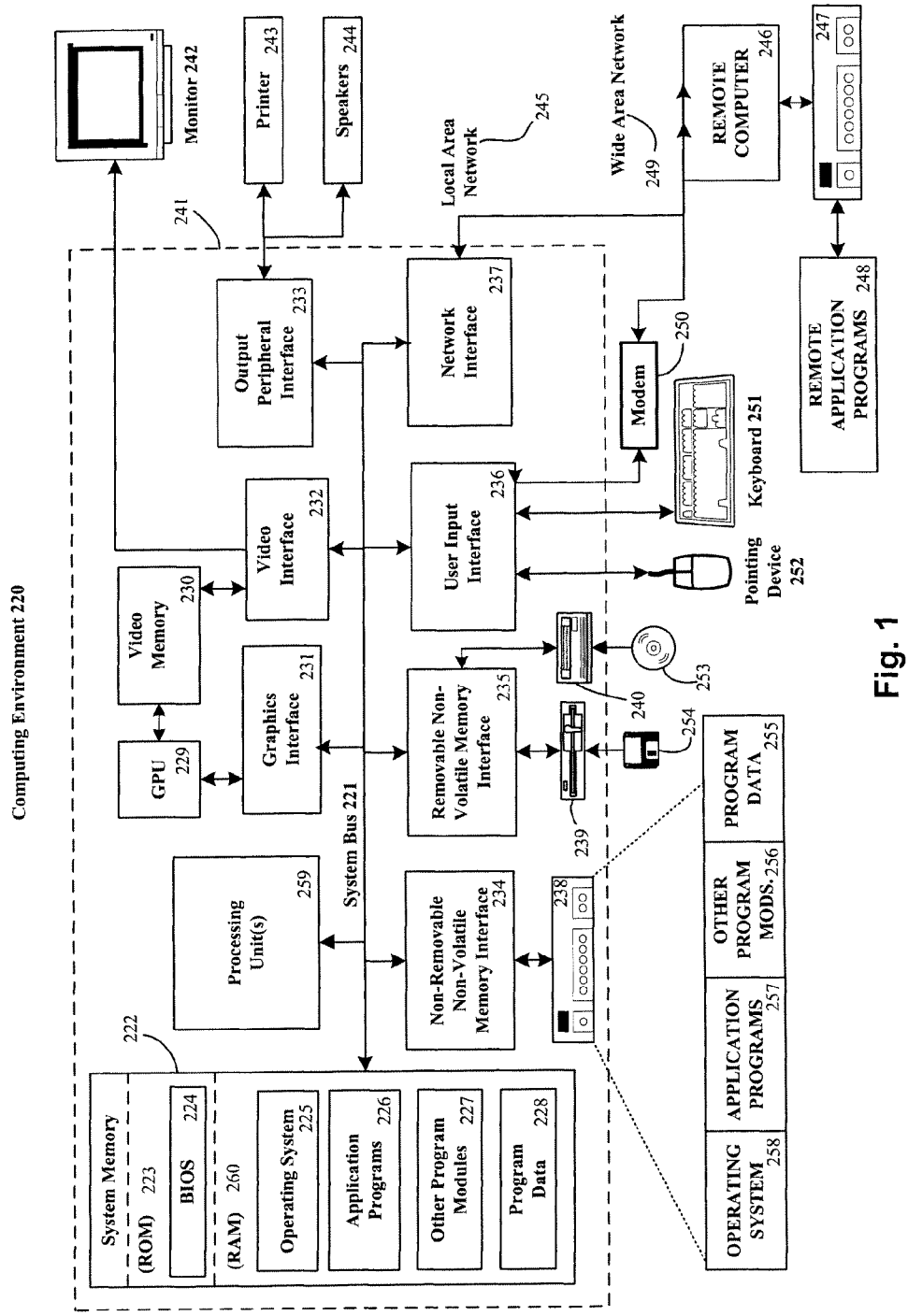
FIG. 1 is a block diagram representing an exemplary and non-limiting computing device suitable for use in conjunction with the present subject matter.

Referring to FIG. 1, shown is a block diagram representing an exemplary computing environment suitable for use in conjunction with implementing the processes described below. For example, the computer executable instructions that carry out the processes and methods for providing the subject matter of the present disclosure may reside and/or be executed in such a computing environment as shown in FIG. 1. The computing system environment 220 is only one example of a suitable computing environment and is not intended to suggest any limitation as to the scope of use or functionality of the subject matter. Neither should the computing system environment 220 be interpreted as having any dependency or requirement relating to any one or combination of components illustrated in the exemplary computing system environment 220. For example a computer game console may also include items such as those described below for use in conjunction with implementing the processes described above.

Aspects of the subject matter are operational with numerous other general purpose or special purpose computing system environments or configurations. Examples of well known computing systems, environments, and/or configurations that may be suitable for use with the subject matter include, but are not limited to, personal computers, server computers, handheld or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the subject matter may be implemented in the general context of computer-executable instructions, such as program modules, being executed by a computer. Generally, program modules include routines, programs, objects, components, data structures, etc. that perform particular tasks or implement particular abstract data types. Aspects of the subject matter may also be practiced in distributed computing environments where tasks are performed by remote processing devices that are linked through a communications network. In a distributed computing environment, program modules may be located in both local and remote computer storage media, including memory storage devices.

An exemplary system for implementing aspects of the subject matter includes a general purpose computing device in the form of a computer 241. Components of computer 241 may include, but are not limited to, a processing unit 259, a graphical processing unit 229 (GPU), a video memory 230, a graphics interface 231, a system memory 222, and a system bus 221 that couples various system components including the system memory 222 to the processing unit 259. The system bus 221 may be any of several types of bus structures, including a memory bus or memory controller, a peripheral bus, and a local bus, using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 241 typically includes a variety of computer-readable media. Computer-readable media can be any available media that can be accessed by computer 241 and includes both volatile and non-volatile media, removable and non-removable media. By way of example and not limitation, computer-readable media may comprise computer-storage media and communication media. Computer-storage media includes both volatile and non-volatile, removable and non-removable media implemented in any method or technology for storage of information such as computer readable instructions, data structures, program modules or other data. Computer-storage media includes, but is not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 241. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, radio frequency (RF), infrared and other wireless media. Combinations of any of the above should also be included within the scope of computer-readable media.

The system memory 222 includes computer-storage media in the form of volatile and/or non-volatile memory such as ROM 223 and RAM 260. A BIOS (basic input/output system) 224 containing the basic routines that help to transfer information between elements within computer 241, such as during start-up, is typically stored in ROM 223. RAM 260 typically contains data and/or program modules that are immediately accessible to and/or presently being operated on by processing unit 259. By way of example and not limitation, FIG. 1 illustrates operating system 225, application programs 226, other program modules 227, and program data 228.

The computer 241 may also include other removable/non-removable, volatile/non-volatile computer storage media. By way of example only, FIG. 1 illustrates a hard disk drive 238 that reads from or writes to non-removable, non-volatile magnetic media, a magnetic disk drive 239 that reads from or writes to a removable, non-volatile magnetic disk 254, and an optical disk drive 240 that reads from or writes to a removable, non-volatile optical disk 253 such as a CD ROM or other optical media. Other removable/non-removable, volatile/non-volatile computer-storage media that can be used in the exemplary operating environment include, but are not limited to, magnetic tape cassettes, flash memory cards, DVDs, digital video tape, solid state RAM, solid state ROM, and the like. The hard disk drive 238 is typically connected to the system bus 221 through a non-removable memory interface such as non-removable non-volatile memory interface 234, and magnetic disk drive 239 and optical disk drive 240 are typically connected to the system bus 221 by a removable memory interface, such as removable non-volatile memory interface 235.

The drives and their associated computer-storage media, discussed above and illustrated in FIG. 1, provide storage of computer-readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Other input devices (not shown) may include a microphone, joystick, game pad, satellite dish, scanner, or the like. These and other input devices are often connected to the processing unit(s) 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface 237. When used in a WAN networking environment, the computer 241 typically includes a modem 250 or other means for establishing communications over the WAN 249, such as the Internet. The modem 250, which may be internal or external, may be connected to the system bus 221 via the user input interface 236 or other appropriate mechanism. In a networked environment, program modules depicted relative to the computer 241, or portions thereof, may be stored in the remote memory storage device. By way of example and not limitation, FIG. 1 illustrates remote application programs 248 as residing on memory storage device 247. It will be appreciated that the network connections shown are exemplary and that other means of establishing a communications link between the computers may be used.

It should be understood that the various techniques described herein may be implemented in connection with hardware or software or, where appropriate, with a combination of both. Thus, the methods and apparatus of the subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the subject matter, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and may be combined with hardware implementations.

Although exemplary embodiments may refer to utilizing aspects of the subject matter in the context of one or more stand-alone computer systems, the subject matter is not so limited, but rather may be implemented in connection with any computing environment, such as a network or distributed computing environment. Still further, aspects of the subject matter may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the subject matter should not be limited to any single embodiment, but rather should be construed in breadth and scope in accordance with the appended claims.

Figure 2:
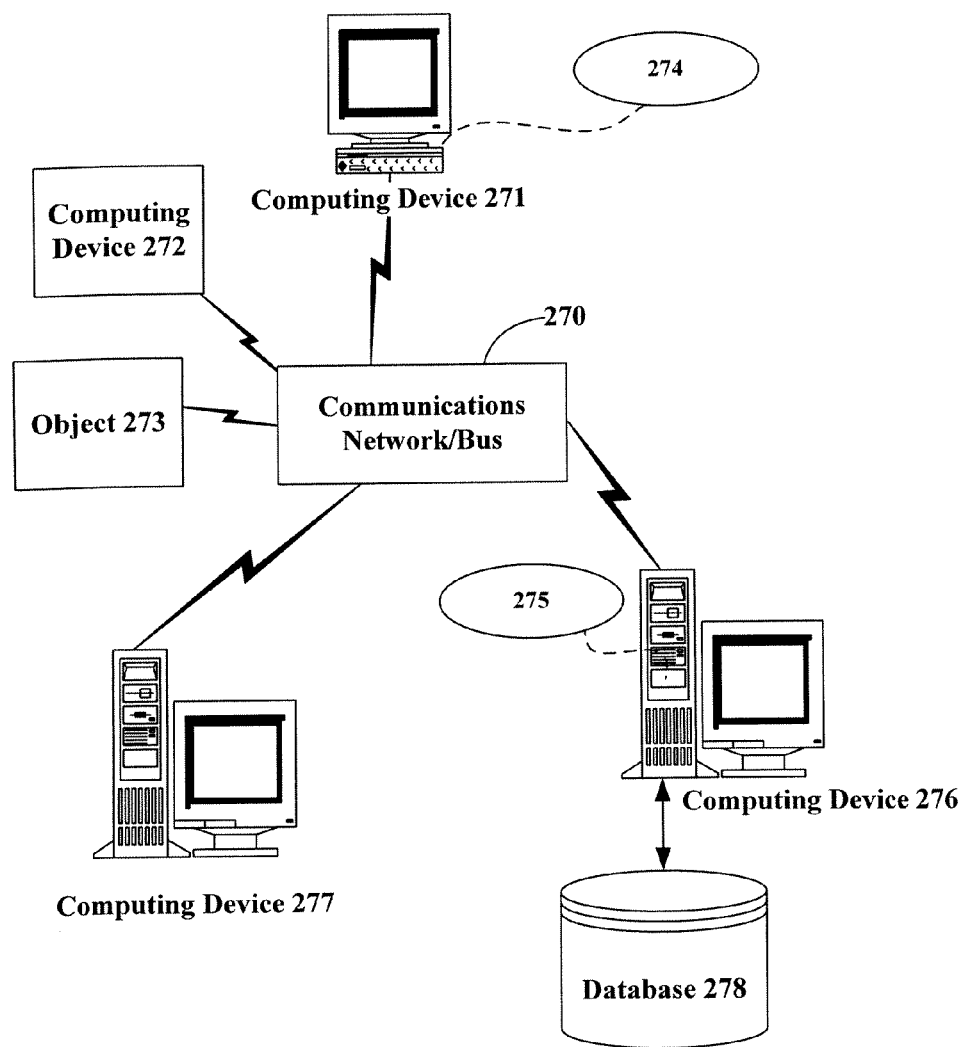
FIG. 2 illustrates an exemplary and non-limiting networked computing environment in which many computerized processes may be implemented to provide the present subject matter.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing the processes for providing the subject matter of the present disclosure. One of ordinary skill in the art can appreciate that networks can connect any computer or other client or server device, or that computers may be connected in a distributed computing environment. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects, or resources that may use the processes described herein.

FIG. 2 provides a schematic diagram of an exemplary networked or distributed computing environment. The environment comprises computing devices 271, 272, 276, and 277 as well as objects 273, 274, and 275, and database 278. Each of these computing devices 271, 272, 273, 274, 275, 276, 277 and 278 may comprise or make use of programs, methods, data stores, programmable logic, etc. The computing devices 271, 272, 273, 274, 275, 276, 277 and 278 may span portions of the same or different devices such as personal data assistants (PDAs), audio/video devices, MP3 players, personal computers, etc. Each computing device 271, 272, 273, 274, 275, 276, 277 and 278 can communicate with another computing device 271, 272, 273, 274, 275, 276, 277 and 278 by way of the communications network/bus 270. In this regard, any entity may be responsible for the maintenance and updating of a database 278 or other storage element.

The communications network 270 may itself comprise other computing entities that provide services to the system of FIG. 2, and may itself represent multiple interconnected networks. In accordance with an aspect of the subject matter, each computing device 271, 272, 273, 274, 275, 276, 277 and 278 may contain discrete functional program modules that might make use of an API, or other object, software, firmware and/or hardware, to request services of one or more of the other computing devices 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., or software objects such as interfaces, communication (COM) objects, and the like.

There are a variety of systems, components, and network configurations that support distributed computing environments. For example, computing systems may be connected by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, the computer systems communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the subject matter should not be limited to any single embodiment, but rather should be construed in breadth and scope in accordance with the appended claims.

The Check 21 Act allows the use of a digital image of a negotiable instrument for processing a negotiable instrument deposit transaction in lieu of using the physical negotiable instrument. The ownership and use of digital cameras for image capture have increased over the past several years. When a picture is taken using a digital camera, the raw digital image information is typically compressed and stored in joint photographics expert group ("JPG" or "JPEG") digital image file formats, which are functionally the same but with different file extensions, depending upon the software. Digital cameras using other software platforms may compress and save the image using other formats, such as graphic interchange form a ("GIF"), JPEG, Windows bitmap ("BMP"), etc.

A digital camera may also take pictures in a video format, such as the Motion Picture Exports Group ("MPEG") format.

If a digital video is taken, a digital image may be extracted from one of the frames of the digital video and used as a substitution for a single picture. The extraction of an image is not limited to digital video, as pictures taken from plastic video may be used as well.

To extract character information from the digital image, the digital image file may be processed through an optical character recognition (OCR) application. There are generally two OCR methods of extracting information from a digital image file: matrix matching and feature extraction. Matrix matching analyzes the digital image and extracts possible characters. The extracted characters are then compared against a library of characters to determine if there is a match. If a match is determined, a corresponding ASCII character is assigned to the extracted character. Feature extraction, or intelligent character recognition (ICR), uses a process that looks for features such as open areas, diagonal lines, intersections of lines, closed shapes, etc. The application then uses that information and intelligence about the process to extract information. Feature extraction is a more robust analysis but typically requires more processing power than does matrix matching.

Figure 3A:
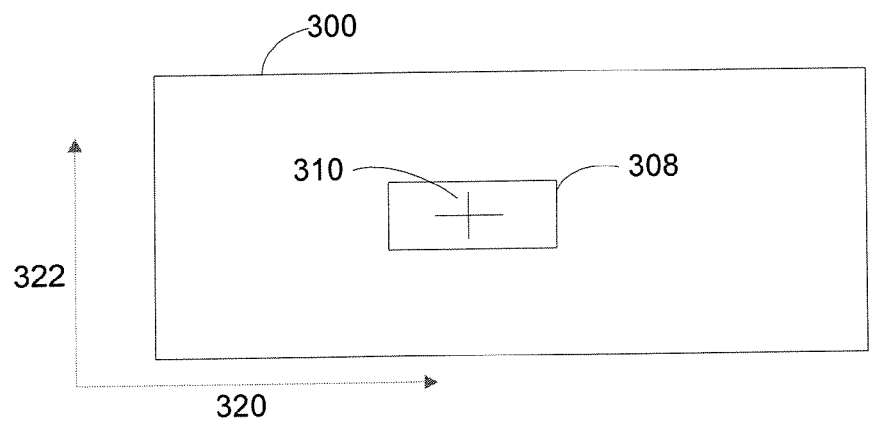
FIG. 3a is an exemplary and non-limiting diagram illustrating an image of a negotiable instrument.

For example, FIG. 3a illustrates a digital image of negotiable instrument 300 taken by a digital camera. Negotiable instrument 300 has box 308 which has character "+"310 within the box. The digital image rotation, or skew, is shown to be zero (0), as illustrated by the matching of the borders of negotiable instrument 300 with y-axis 322 and x-axis 320. Because the skew of the digital image in FIG. 3a is negligible, the less robust matrix matching technique may be a technique that may require less computing resources, though the feature extraction may also be used interchangeably.

Figure 3B:
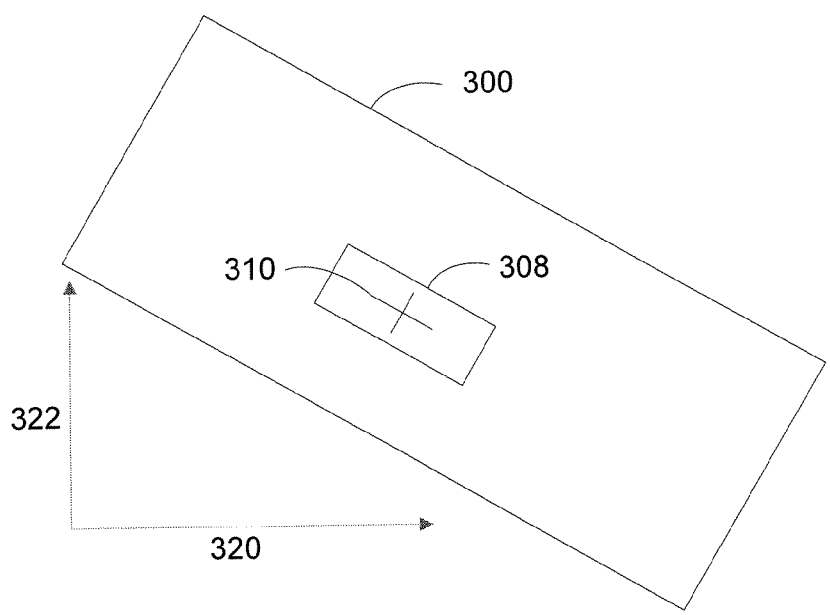
FIG. 3b is an exemplary and non-limiting diagram illustrating another image of a negotiable instrument.

If the image is skewed, feature extraction may be used to properly extract and recognize characters in the image. FIG. 3b is a digital image of negotiable instrument 300 of FIG. 3a having box 308 with character "+"310 within the box. The digital image has a degree of skew, illustrated by the angle of rotation of negotiable instrument 300 in relation to y-axis 322 and x-axis 320. If the skew is significant, a matrix matching technique may not be useful. For Example, character "+"310 may be interpreted as an "X" rather than a "+". Feature extraction may also be used, as box 308 may be recognized, but may be limited in the determination of character "+"310. In order to determine the identification of characters in negotiable instrument 300, the skew of the digital image may need to be determined and compensated for prior to character extraction and recognition, as described below.

Figure 3C:
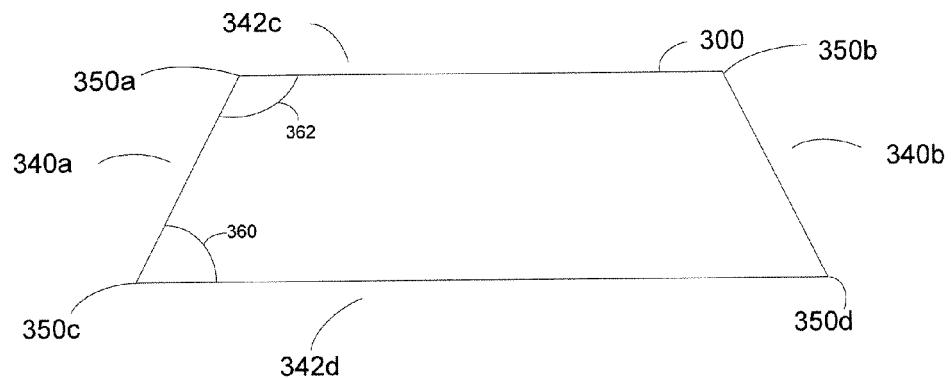
FIG. 3c is an exemplary and non-limiting diagram illustrating a distorted image of a check.

While skew or rotation may be one way in which distortion of the digital image may occur, if a user that takes a picture of the negotiable image does not position the digital camera in an optimal position, the digital image of the negotiable instrument may be distorted. For example, the digital image may be distorted to a degree so that the shape of the negotiable image is not rectangular, but rather, trapezoidal, as shown in FIG. 3c. The image may be distorted in other manners, and thus, the present subject matter is not limited to a trapezoidal distortion. It should be appreciated that an image may be distorted in ways other than the non-limiting and exemplary trapezoidal distortion. The present disclosure is not limited to any one type of distortion.

FIG. 3c is an exemplary and non-limiting diagram illustrating a distorted image captured by taking a digital picture of check 300. Check 300 has sides 340a-d and corners 350a-d. A significant portion of negotiable instruments used in commerce are rectangular in shape, i.e. the sides of check 300, in the physical embodiment, form a rectangle where two parallel sides are essentially of one length and where the other two parallel sides are essentially of the same or another length. Further, the internal angles of check 300, illustrated by angles 360 and 362, are 90 degrees in the physical embodiment.

As shown, the digital image captured by taking a picture of check 300 does not follow the basic qualities of a rectangle. Rather, the digital image of FIG. 3c illustrates a trapezoidal shape caused by, among other things, a camera viewing angle of a suboptimal position, creating a distorted image. The suboptimal position may occur if the digital camera is not positioned directly above check 300. Sides 342a and 342b, while parallel to each other, are shown to not be equal in length. Sides 342c and 342d, while also parallel to each other, are shown to not be equal in length. Further, because the image is not a rectangular representation of check 300, angles 362 and 360 are not 90 degrees. Thus, if an OCR or ICR feature extraction process were to be performed on the image of FIG. 3c, the information may be erroneous. Further, the image may be distorted to a point that the image may not be acceptable for use within the Federal Check Clearinghouse system, or other check clearings systems that may be implemented.

To remove the distortion, the image may be modified. An exemplary and non-limiting process of removing distortion may be to use a technique called spatial transformation, also known as image warping. In spatial transformation, a pixel in the image of FIG. 3c is mapped or placed into a position in a new image, such as image of FIG. 3d. The process repeats until all or an acceptable number of pixels in the original image are mapped to form an output image, resulting in a warped imaged. The position of the pixel and the relative position of other pixels of an input image to an output image, such as the image of FIG. 3d, may be determined by using geometrically known information. For example, a negotiable instrument, such as check 300, will have 4 corners and sides that are positioned and sized to form a rectangle. Further, the internal angles of check 300 will most likely be essentially 90 degrees. Although the present subject matter uses warping to remove the distortion from an image, it should be appreciated that other methods of distortion removal may be used, and thus, the present subject matter is not limited to any particular type of image distortion removal.

One exemplary and non-limiting way in which image warping may be accomplished may be to use information about the four corners of check 300 to determine new positions of pixels. Although the present subject matter uses the four corners of the image to warp an image, it should be appreciated that other methods of warping an image may be used, and thus, the present subject matter is not limited to using the four corners of an image. Although the four corners of an image, such as the image in FIG. 3c, may be determined upon initial analysis of the image, if the image has colors or features in the body, or the portion of the image within the four corners, of the image, the analysis may be difficult and/or unreliable. Thus, it may be preferable, for the purpose of analyzing the image, to first remove any colors or features within the body of the image.

One exemplary and non-limiting way in which to remove the features in the body of the image is to use the image histogram values to reduce certain image values to essentially null. Although the present subject matter uses the image histogram to remove features in the body of the image, it should be appreciated that other methods may be used, and thus, the present subject matter is not limited to using the image histogram. An image histogram is a graphical representation of the number of pixels across the particular shades of the image. Certain values of the histogram may be essentially zeroed, or floored, so that the image contents may be removed. For example, the values in the histogram resembling black may be floored. Once the features in the body are essentially removed, a convolution filter may be applied to "blank" any features in the body of the check. The remaining features may need to be removed because they may affect the determination of the corners of the image.

After the image has been prepared, the image may be analyzed to determine the four corners of the image. FIG. 3e is illustrative of an exemplary and non-limiting way in which the four corners of the image of check 300 may be determined. For purposes of the following explanation, the determination of corner 388 is explained, though it should be appreciated that the other corners may be determined using the same or a similar process. In FIG. 3e is shown an image of check 300. The image is distorted in a manner similar to the image in FIG. 3c, e.g. the image does not appear to be rectangular in shape. To warp the image, the location of corner 388 is determined.

In one exemplary and non-limiting way in which the location of corner 388 may be determined, the edges of the image of FIG. 3e are analyzed. As shown, the image of check 300 is placed in a geometric frame of reference, represented by axis X and axis Y. A process may start at or near the expected middle of the image and near the origin and determine the left boundary, or side, of the image by analyzing lines of the image, represented by analysis lines 380. The process may continue until going up axis Y until a left boundary is not found, represented by analysis line 386. Because the left boundary was not located when analyzing along line 386, the last analysis line to locate the left boundary is the top of the image, shown by location X1,Y1.

The right side of the image is then analyzed in a similar fashion. To reduce the analysis time, the process may begin at a Y coordinate close to or slightly less than Y1, represented by location X2, Y2. The analysis continues until the top of the image is determined from analysis line 384, represented by location X3, Y1. Although the Y coordinates of the left and right side are shown to be the same, Y1, it should be understood that the top left of the image may be different than the top right of the image. For example, the image may be rotated. The result is that corner 388 is determined to be location X3, Y1.

Figure 3D:
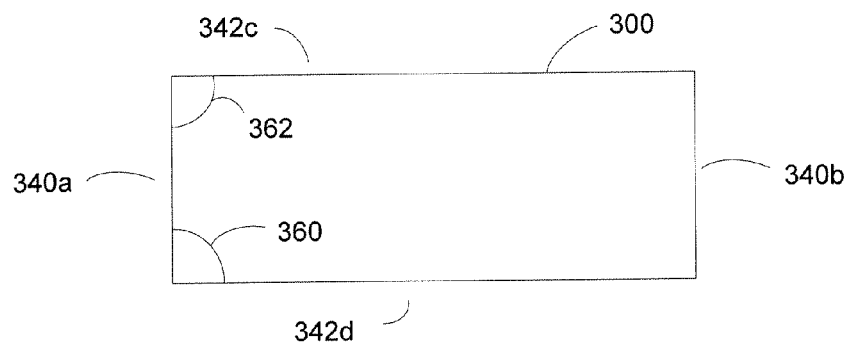
FIG. 3d is an exemplary and non-limiting diagram illustrating an image in which the distortion of the image has been at least partially removed.
Figure 3E:
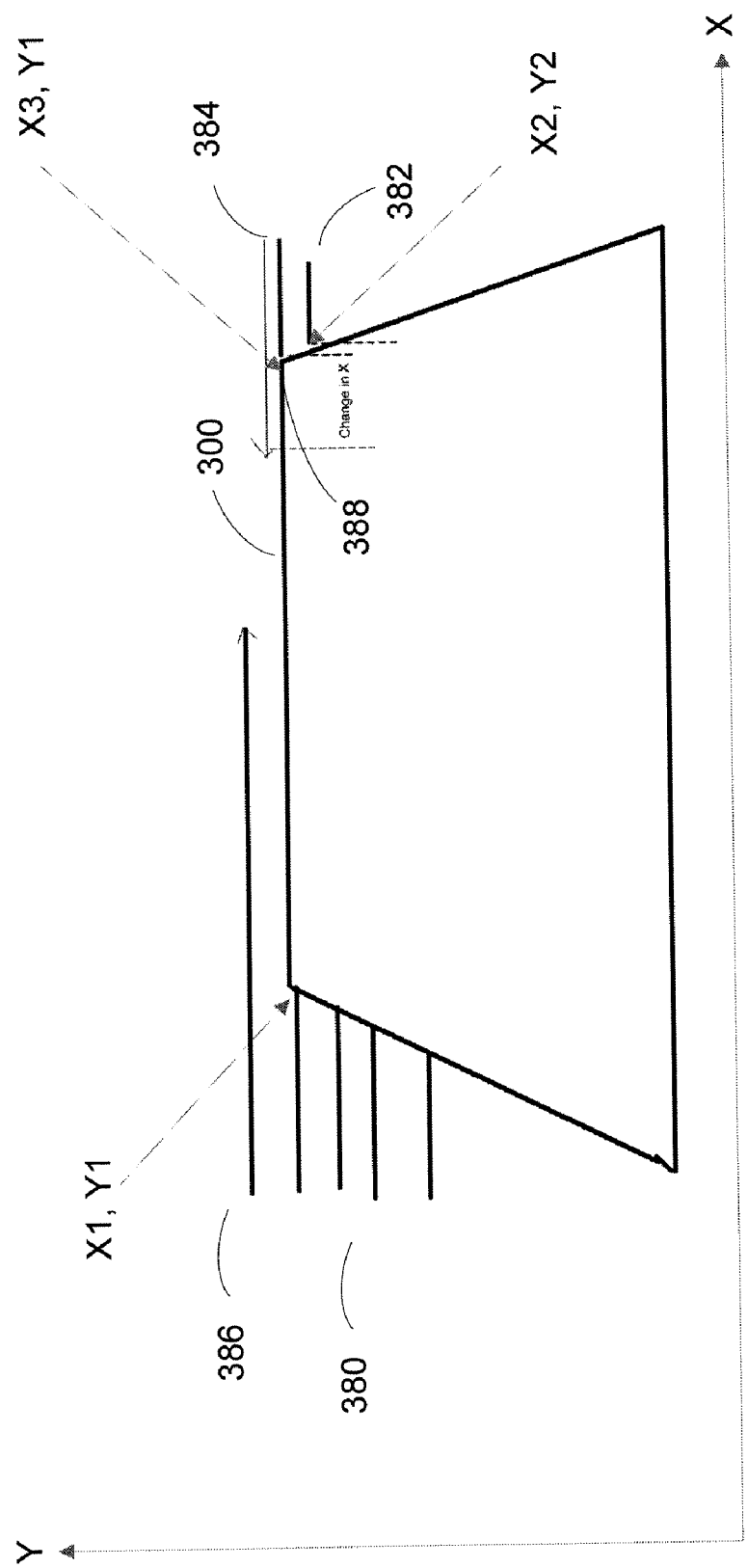
FIG. 3e is an exemplary and non-limiting diagram illustrating the determination of a corner of a distorted image to warp the image.

Once the corners are determined, to warp the image into an output image, such as the image of FIG. 3d, the location of the pixels in the image of FIG. 3e to FIG. 3c needs to be determined. Thus, a qualitative analysis of the distortion of the image of FIG. 3e needs to be determined. One exemplary and non-limiting way in which to determine image distortion is to use the information from the corner determination. For example, the slope of a line between X3 and X2 may be used to determine the amount of distortion. If the image was not distorted, such as the image in FIG. 3d, a slope of a line between X3 and X2 would be infinite, resulting in no distortion along the X axis. Using information from the other corners, or another corner as desired, the distortion of the image of FIG. 3e may be determined. Once the distortion is determined, i.e. the amount of change of the image on both the X and Y axis, the pixels may be mapped to an output image based upon that distortion.

Figure 4A:
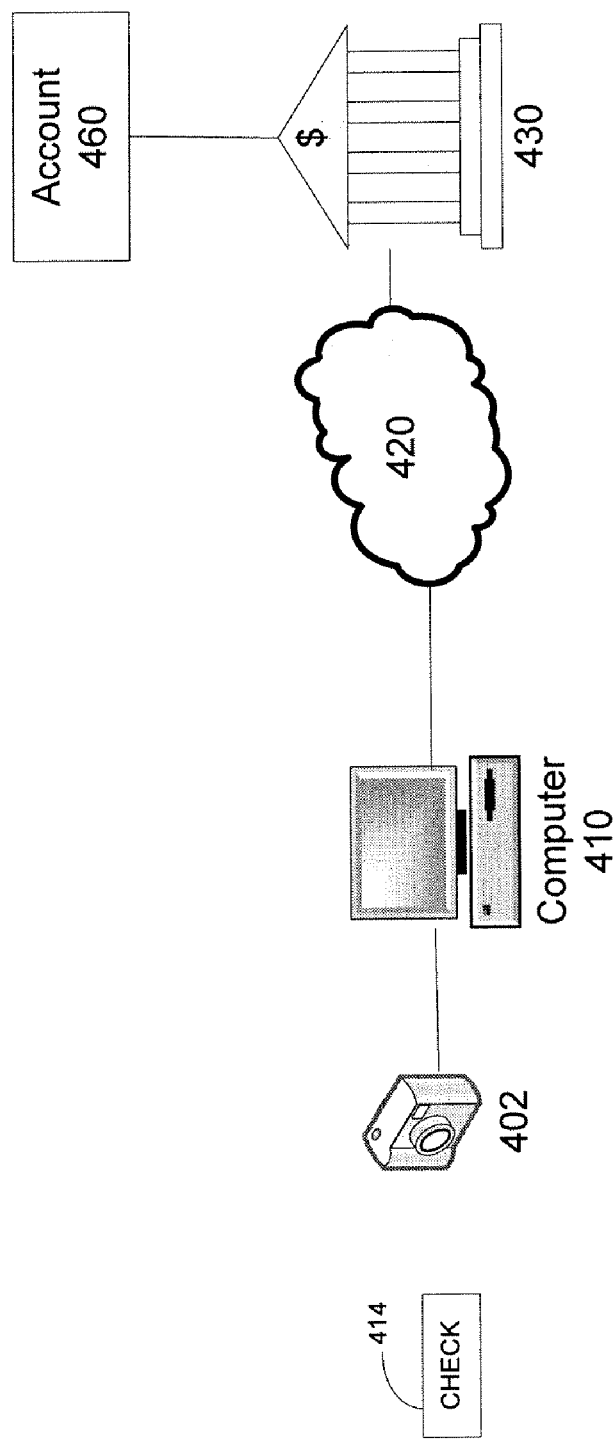
FIG. 4a is an exemplary and non-limiting diagram illustrating a system for using a digital camera for capturing an image of a negotiable instrument.

FIG. 4a illustrates an exemplary and non-limiting system for using a digital camera to capture a digital image of a negotiable instrument. An account owner (not shown) has financial account 460 established at bank 430. Bank 430 is configured to process a deposit transaction using a digital image of a negotiable instrument rather than the negotiable instrument itself. The account owner establishes communication pathway 420, which may be through an Internet connection, with bank 430 in anticipation of depositing check 414. The account owner uses digital camera 402 to capture an image of check 414. The digital image is compressed and stored as various file formats, including jpg. The account owner then downloads the digital image to computer 410 and submits via communication pathway 420 the digital image to the bank 430 for processing.

In one exemplary and non-limiting example, check 414 may be a method of payment to a business. In that example, the account owner may be the business owner. In another exemplary and non-limiting embodiment, computer 410 may be associated with a customer of a business that controls account 460. In that example, the customer may transmit an image of check 414 to bank 430 for payment of a debt.

Figure 4B:
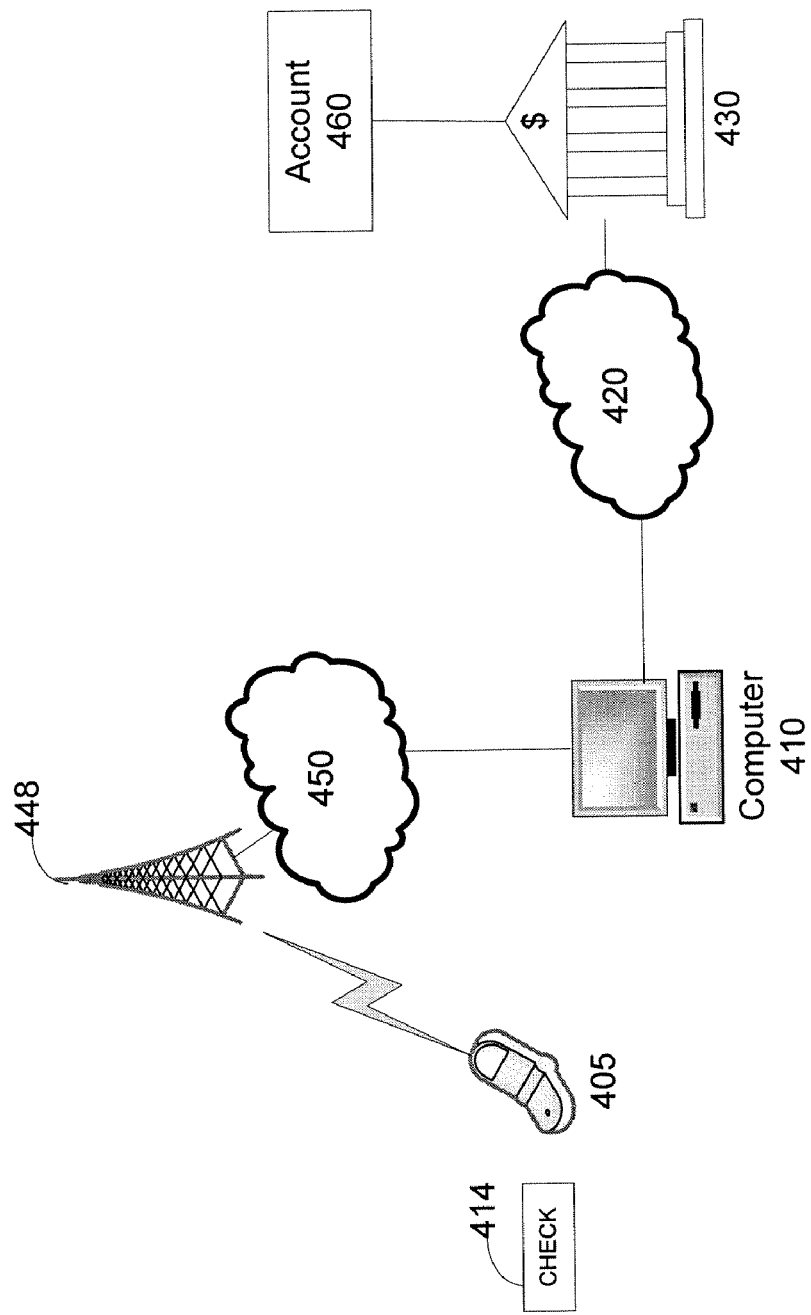
FIG. 4b is an exemplary and non-limiting diagram illustrating a system for using a cellular phone with an integrated digital camera for capturing an image of a negotiable instrument.

Digital camera 402 may be a standalone digital camera or may be integrated with other electronic equipment, such as a personal data assistant, a web camera, or a cellular phone. FIG. 4b is an exemplary illustration of a system using the digital camera of a cellular phone to capture digital images. As in FIG. 4a, account owner (not shown) has account 460 with bank 430. Account owner uses computer 410 to establish communication pathway 420 with bank 430 in anticipation of depositing check 414 into account 460. Account owner uses the digital camera of cellular phone 405 to capture a digital image of check 414. The digital image is stored in cellular phone 405 after capture.

The account owner then causes the cellular phone 405 to transmit the digital image to computer 410 via a cellular network, illustrated in part by cellular transceiver 448 and network 450. The connection of network 450 with computer 410 may vary, the present disclosure not being limited to any one particular type of connection. For exemplary purposes only, the connection may be via an Internet connection between a cellular network and computer 410. Once the digital image is received at computer 410, the account owner may then transmit the digital image to bank 430 for processing a deposit transaction using the digital image.

Figure 5:
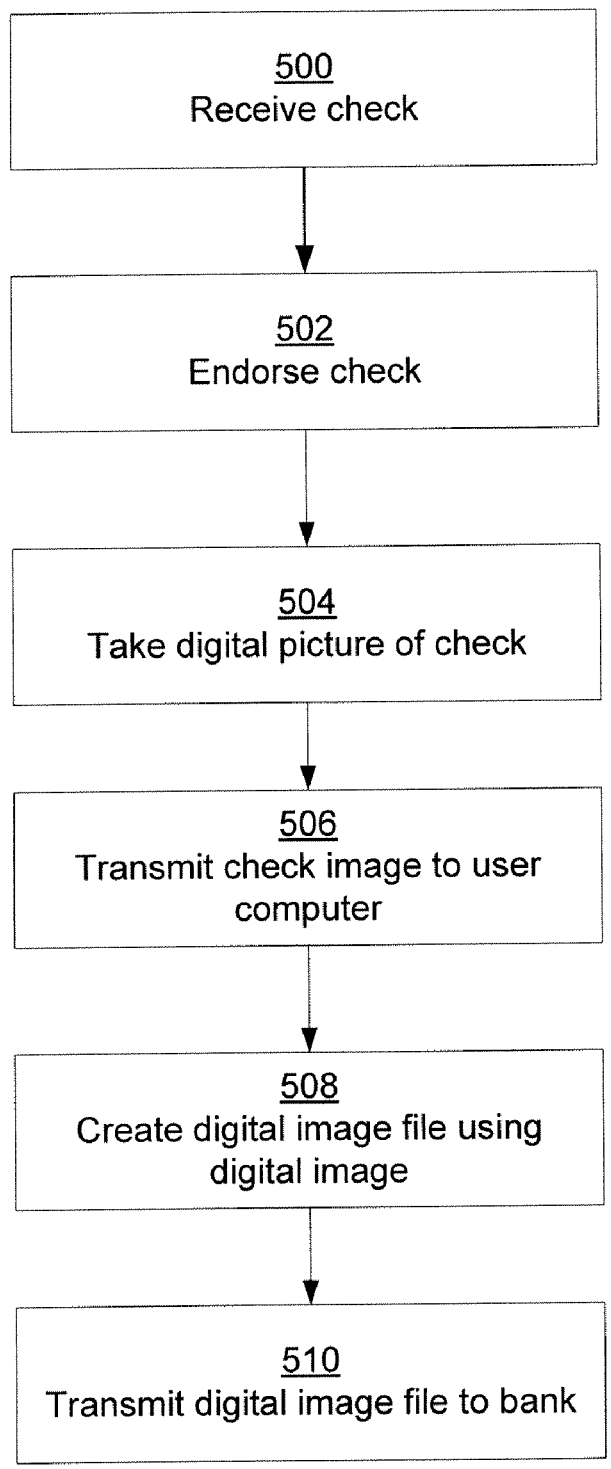
FIG. 5 is an exemplary and non-limiting flow diagram illustrating the capture and submission of a digital image to a bank for deposit processing.

FIG. 5 is illustrative of depositing funds of a negotiable instrument, such as a check, using a digital image. The account owner first receives 500 a check and then endorses 502 the check in anticipation of depositing the check into an account. If the check is to be deposited using electronic means, the account owner then takes 504 a digital picture of the check. The account owner may use various types of digital cameras to take the digital picture, as described above. The present subject matter is not limited to any particular type or combination of digital camera or any particular embodiment of a digital camera within an apparatus or system.

After the digital image is taken, the image is transmitted 506 to the user computer. The transmission may occur using various communication means, including, but not limited to, a direct connection to the computer, radio, infrared, Bluetooth®, local area network, wireless network, 802.x, or a cellular connection using a cellular network. The digital image file is created 508 using the digital image. Although shown after transmitting 506 the digital image, the digital image file may be created 508 prior to transmission if the digital camera is configured to have the capability of compressing and storing the raw digital image in a digital image file format. The digital image file is then transmitted 510 to the bank for processing a deposit transaction. The transmission of the digital image file may occur using various transmission means, including, but not limited to, an Internet connection between the bank and the account owner's computer. The present subject matter is not limited to any one or combination of transmission means.

Figure 6:
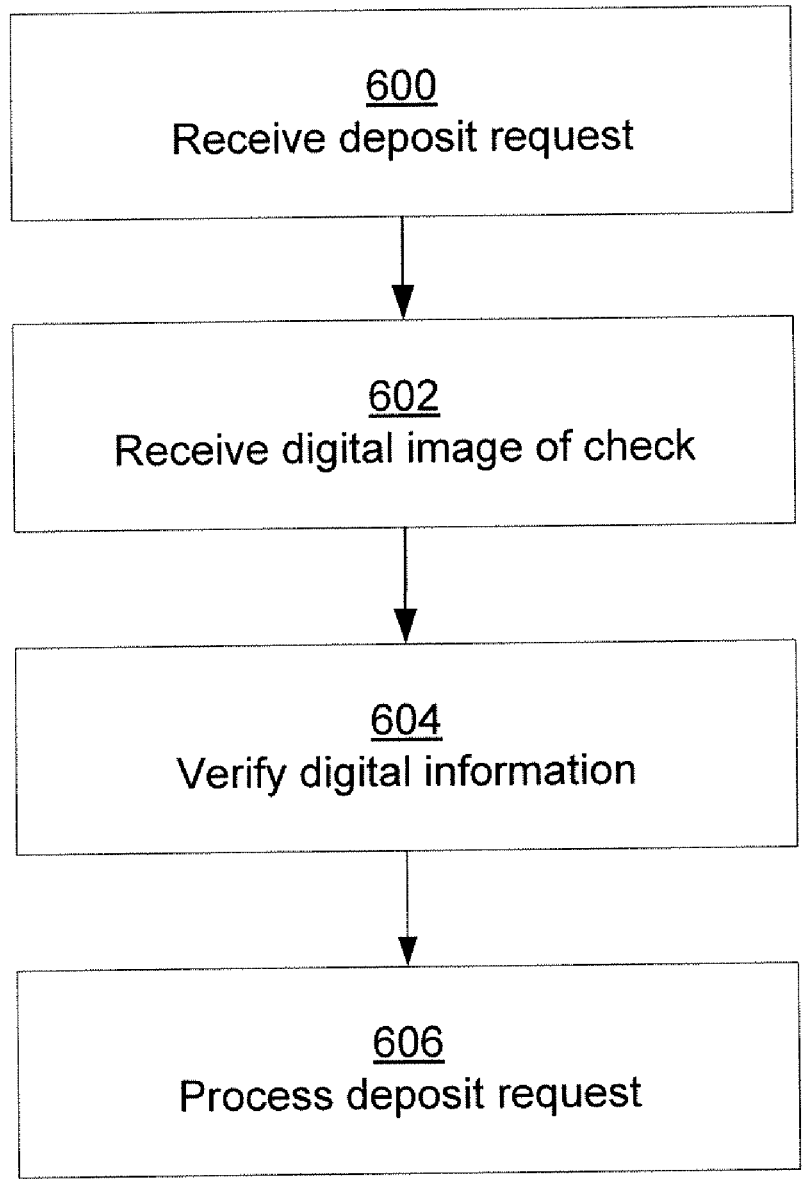
FIG. 6 is an exemplary and non-limiting flow diagram illustrating the receipt of a digital image for deposit processing.

FIG. 6 is illustrative of the receipt and processing of the digital image. The bank will receive 600 a request to deposit a check. The request may be received using various communication means, the present subject matter not being limited to any one or combination of transmission means. The bank then receives 602 the digital image of the check. The digital image may be sent in conjunction with or as a separate transmission from the deposit request. The bank then verifies 604 the digital information.

Depending upon the standards imposed by the Check 21 Act and the bank's own internal image standards, the verification of the digital image may vary. For example, the Check 21 Act may require that the image be of a certain image quality. Although there are several ways in which image quality may be determined, one manner in which it may be done is to perform an OCR operation on the check to determine if at least a portion of the information in the image is determinable. The bank may first attempt to extract and recognize characters within the digital image. Any extracted characters may then be compared to previously known information or information submitted by the account owner in the deposit request. For example, the bank may attempt to find and OCR the magnetic ink character recognition (MICR) line at the bottom of the digital image. If the MICR line is unreadable or the characters identified do not correspond to known and verifiable information, the bank may reject the image.

The bank may also attempt to correct the image if the initial verification process does not yield valid information. Although there may be issues with the resolution and size of the image, a significant portion of images may be deemed less than acceptable because of the skew in the digital image. As discussed previously, skew is the difference in rotation off an axis between a feature in the digital image and the same feature in the physical embodiment of the digital image. The determination of skew of digital images captured using handheld digital cameras typically are computed in 3-dimensions. For exemplary purposes only, the following deskew process uses an x and y axis, though it should be understood that the principles and methods for determining skew in three (3) dimensions use the same principles and are considered to be incorporated into the present subject matter.

To deskew an image, the angle of a reference line within the digital image is determined. More than one reference line may be used as well. The angle of the line or lines is determined using a coordinate system as a reference. For example, one of the lines of box 308 of FIG. 3*b* may be used. The angle of the line is determined in reference to a set of axes, such as y-axis 322 and x-axis 320 of FIG. 3*b*. The image is then digitally rotated so that the angle is zero (0), and another attempt at OCR is performed on the image to determine if the rotated digital image is acceptable for use.

When processing a check, there may be useful reference points in the check that facilitates the proper rotation of the image. For example, a check typically has several horizontal lines near the bottom of the check, used by the check writer to sign the check and to note the use of the check. Additionally, checks are typically rectangular in shape. A determination may be made to use the two long edges of the digital image and/or the lines within the check as reference points. If the image is rotated so that the long lines and/or the lines within the check are horizontal, the check image may be properly deskewed. After deskewing, if necessary, the bank may then perform an OCR operation again to determine if information may be extracted, recognized and verified. If the information is verified, the bank may then process 606 the deposit request.

Figure 6A:
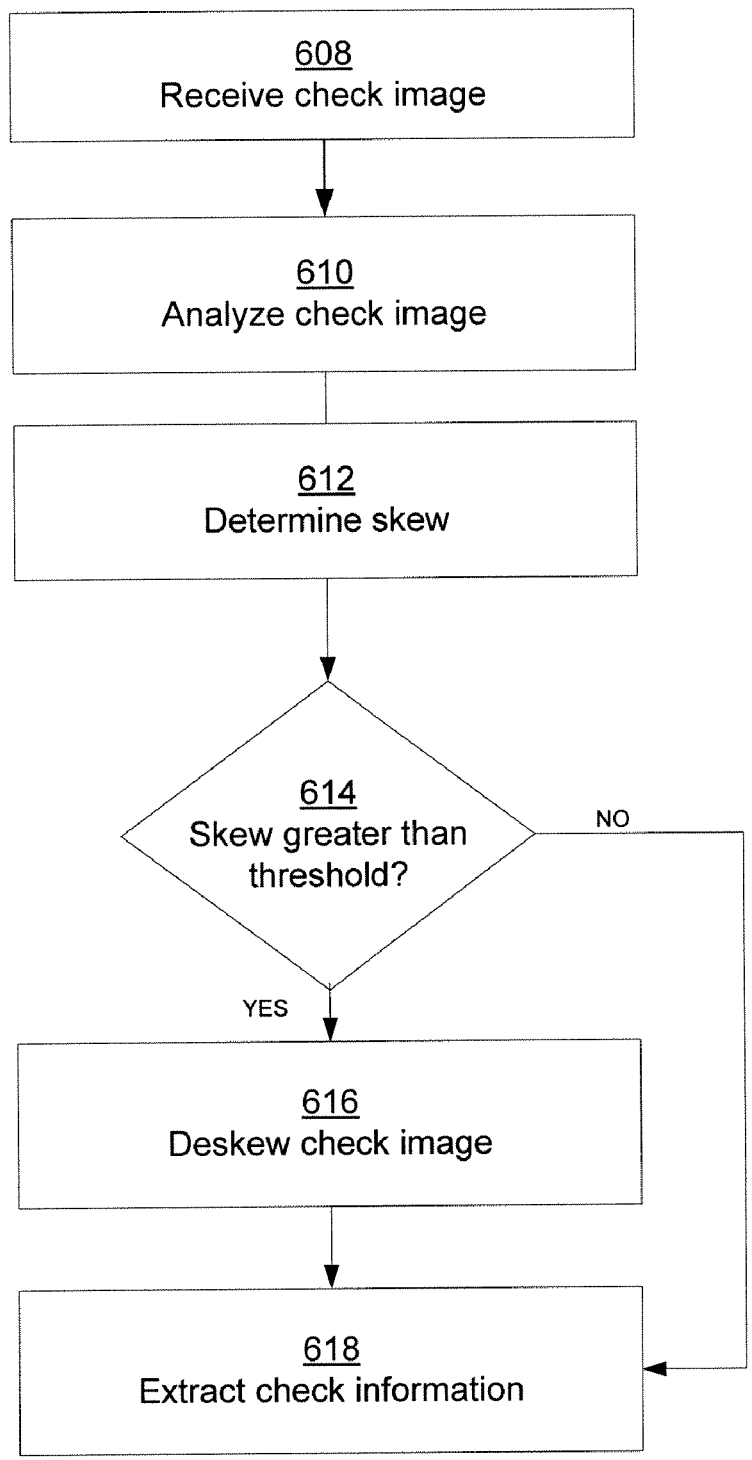
FIG. 6a is an exemplary and non-limiting flow diagram illustrating a process for deskewing a digital image of a negotiable instrument.

FIG. 6*a* is an exemplary and non-limiting flow diagram illustrating a deskew process. The image is received 608 by the bank to be used in connection with a deposit transaction. The check image is analyzed 610 and the amount of skew is determined 612. If the skew is determined 614 to be greater than a threshold amount, the image is deskewed 616 and information is extracted 618 from the check. If the skew is determined 614 to be less than a threshold amount, information is extracted 618 from the check.

Figure 7:
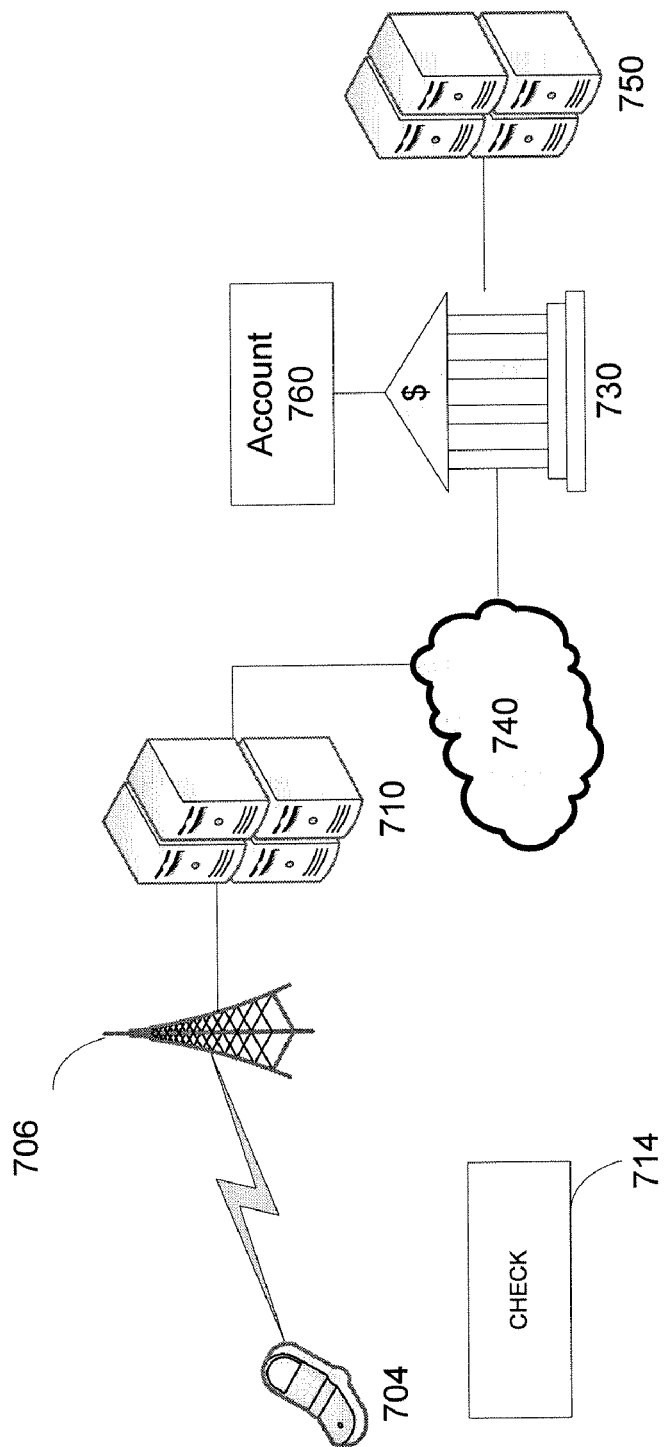
FIG. 7 is an exemplary and non-limiting diagram illustrating the use of a cellular phone to transmit digital image information to a bank.

Because the deskewing process and OCR process may take significant computing resources, a user's computer, such as a home desktop, may not have the processing facilities to handle the computations to verify the digital information. FIG. 7 is illustrative of a system that may facilitate the verification of the digital image information without requiring the user's computer to have the computing resources to handle such an operation. A user (not shown) uses the integrated digital camera in cellular phone 704 to capture a digital image of check 714.

The user causes cellular phone 704 to transmit the digital image to bank 730 via cellular transceiver 706, cellular network application provider 710, and communication pathway 740. Prior to depositing check 714 into account 760, bank 730 may verify the digital image received, determining if the information extracted from the digital image is valid. Bank 730 may use application server 750 to perform the image validation and image correction. By processing the digital image at server 750, the user may not need access to the computing resources that may otherwise be required to verify the digital image.

Figure 8:
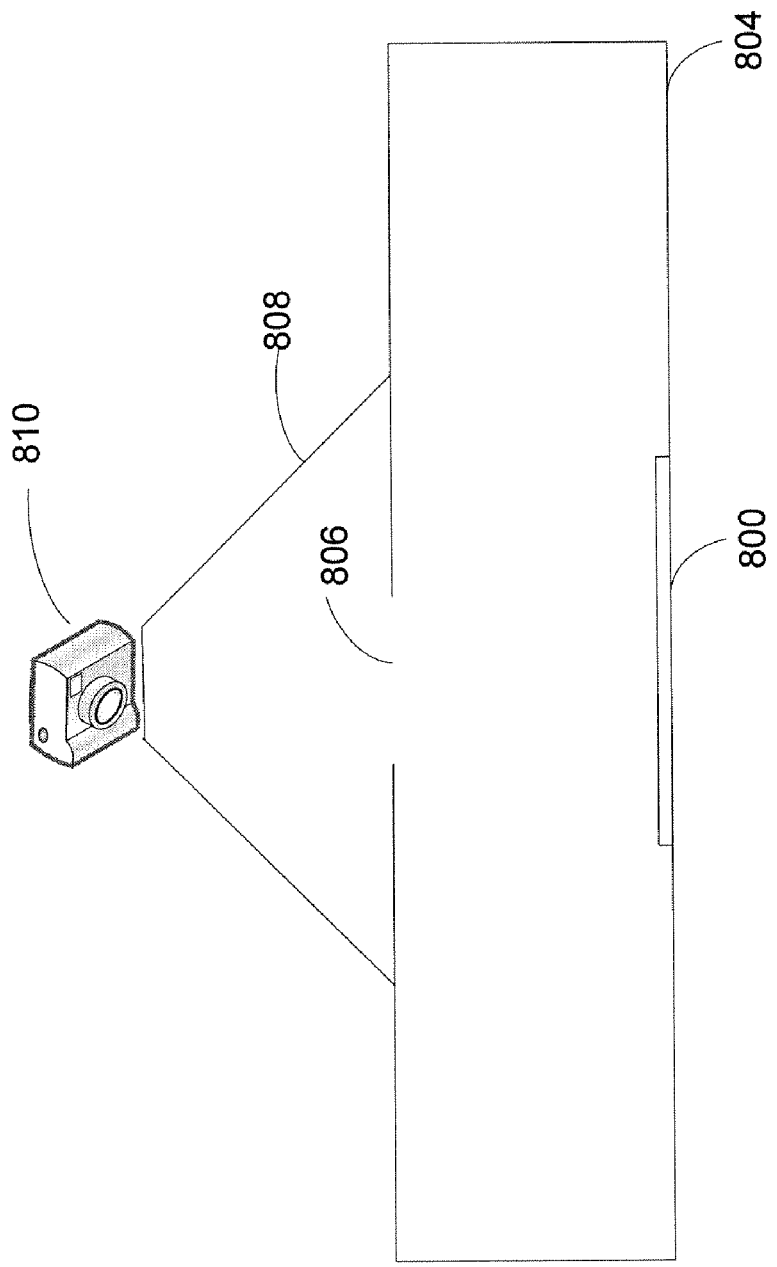
FIG. 8 is an exemplary and non-limiting apparatus for assisting a user to capture a digital image of a negotiable instrument.

To possibly reduce the amount of skew and to increase image quality, a user may use an apparatus to help align the negotiable instrument with the digital camera. FIG. 8 is illustrative of an apparatus that may be used to assist in capturing a digital image. Apparatus 804 may be a box (shown in 2 dimensions) that is sized in a manner that allows the user to place negotiable instrument 800 within the box. Apparatus 804 may also have support platform 808, upon which digital camera 810 may be placed. Support platform 808 may be configured to orient digital camera 810 in a manner to reduce any distortion or skewing of an eventual digital image. To take a picture, apparatus 804 also comprises aperture 806, through which negotiable instrument 800 may be visible to digital camera 810.

Because digital cameras today are becoming increasingly technologically advanced, the digital camera may be loaded with software that provides visual aids to the user to assist the user in aligning the camera with the negotiable instrument. A significant number of digital cameras in use today provide an electronic assistance aid to the camera user when the snapshot button on the digital camera, the button that causes the digital camera to take a picture, is partially depressed. The electronic aid becomes visible through or at the camera's viewfinder. The digital camera may be configured to pre-analyze the preview picture and find features of the image for focus purposes. Typically, the camera will analyze the preview picture to attempt to find a person's face, the closest object, or the largest object in the viewfinder.

Figure 8A:
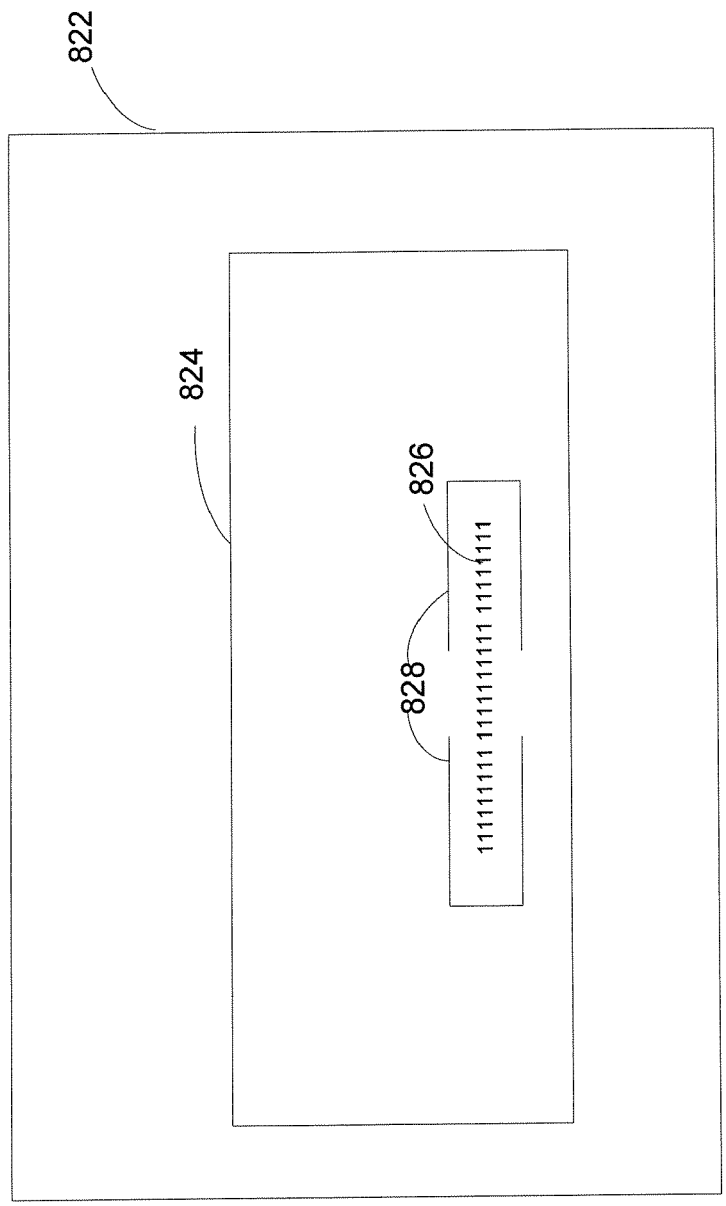
FIG. 8a is an exemplary and non-limiting electronic alignment aid for assisting a user to capture a digital image of a negotiable instrument.

The digital camera may be configured to analyze the image in the viewfinder to assist the user in aligning the camera. FIG. 8*a* illustrates a viewfinder configured to provide an electronic alignment aid. A user aligns a digital camera (not shown) so that negotiable instrument 824 is visible within viewfinder 822. The user partially depresses the snapshot button to begin analysis of the image within viewfinder 822. The digital camera may be configured to attempt to find MICR information 826 of negotiable instrument 824. If the digital camera is able to analyze the image and finds MICR information 826, the camera may expose an alignment aid tool to help the user align the check within the camera. For example, alignment aid tool 828 becomes visible within viewfinder 822 when MICR information 826 is found by the digital camera. The user may align the camera to place MICR information 826 within the boundaries of alignment aid tool 828. Thus, when a picture is taken after alignment, any skew or distortion of the digital image of negotiable instrument 824 may be minimized.

Figure 9:
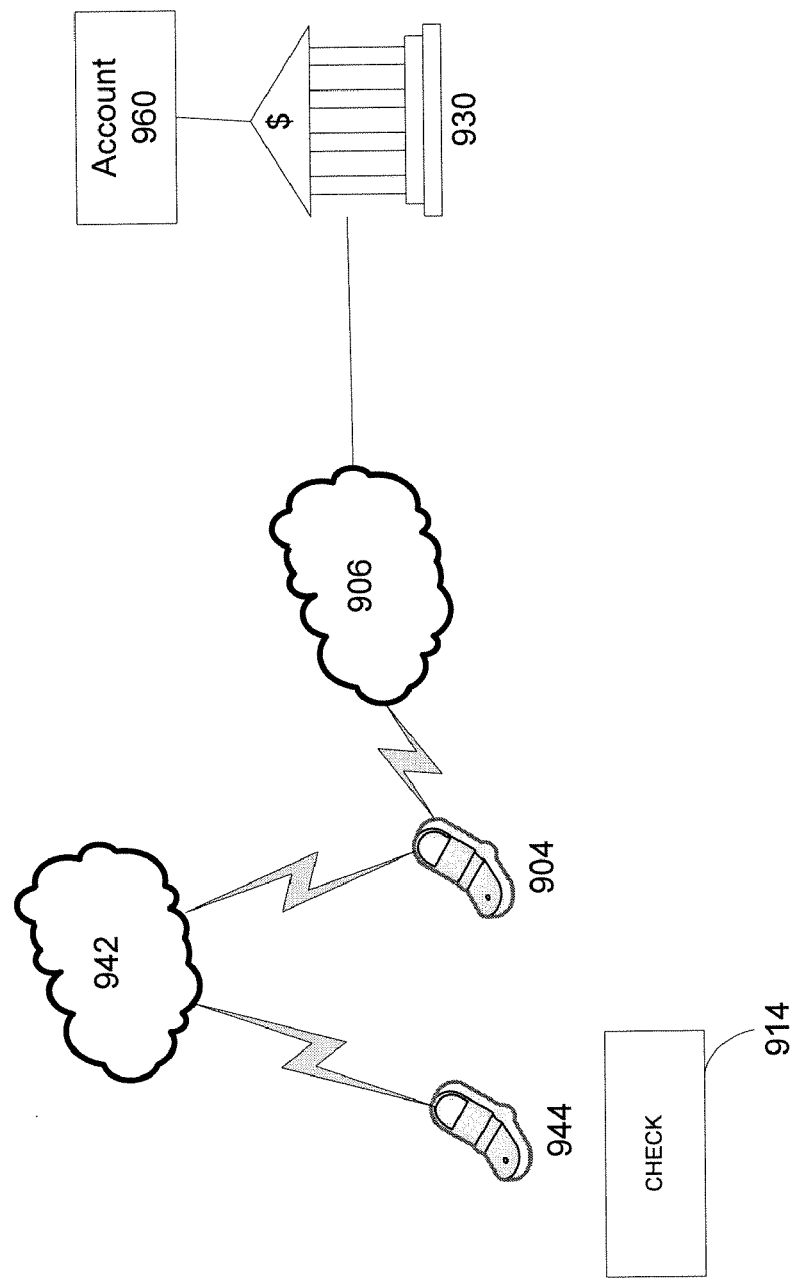
FIG. 9 is an exemplary and non-limiting system for using remote transmission of a digital image using a cellular phone.

With the increasing use of cellular phones today, and because of the increasing integration of digital cameras with cellular phones, there is an increasing likelihood that the digital camera a person may have access to may be the one integrated into their cellular phone. FIG. 9 is an exemplary and non-limiting system using a cellular phone to transmit and communicate digital image information.

In FIG. 9, a user (not shown) has account 960 with bank 930. Another person, such as a business associate, may write check 914 to the user as payment for a past debt or for other reasons. Because of various reasons, the user holding account 960 or the user writing check 914 may not find it efficient or feasible to mail check 914. Thus, the user writing check 914 may take an image of check 914 using the digital camera of cellular phone 944. The user writing check 914 may then transmit the image via cellular network 942 to cellular phone 904 of the user holding account 960. The user holding account 960, after receiving the image, may then transmit the digital image to bank 930 via communication pathway 906, which may include a combination of a cellular network and/or an Internet connection. After receiving the image, bank 930 may process the image for deposit into account 960.

Figure 10:
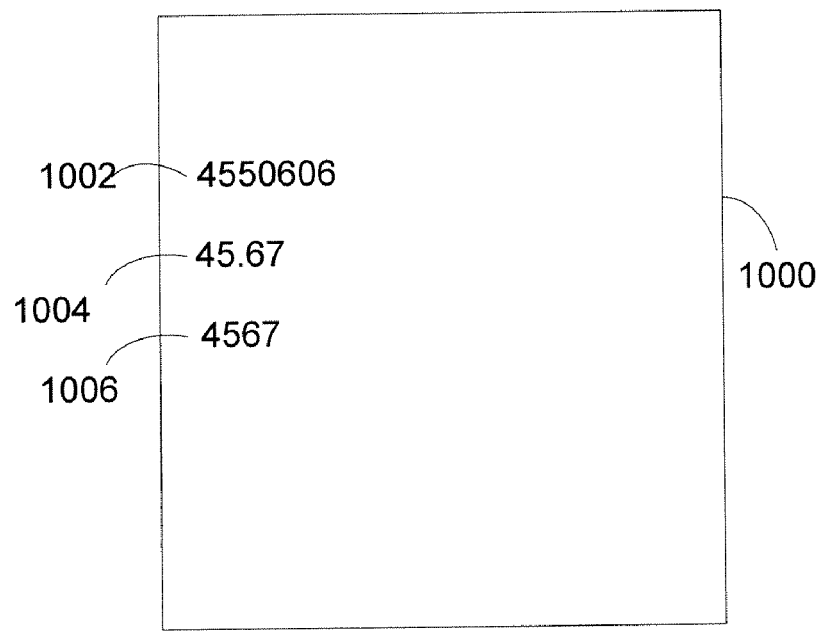
FIG. 10 is an exemplary and non-limiting screenshot of a text message for use in transmitting a digital image of a negotiable instrument.

To help facilitate the transaction, the user holding account 960 may send additional information to bank 930. For example, the user may send a text message. A text message for a cellular phone is alphanumeric data transmitted over the cellular network instead of voice data. FIG. 10 is an exemplary and non-limiting screenshot of a cellular phone, such as cellular phone 904 of FIG. 9, showing information that may be sent along with the digital image. Screen 1000 shows text information that may need to be provided to a bank to process a deposit transaction. Text 1002 may be an account number. Text 1004 may be an amount to be deposited. Text 1006 may be a pass code, password, or a personal identification number, which may be used to provide a level of security. The text information may be sent in the same message as the digital image, in a prior message or a subsequent message.

The methods and apparatus of the present subject matter may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the subject matter. When implemented on a general-purpose processor, the program code combines with the processor to provide a unique apparatus that operates to perform the functionality of the present subject matter.

While the present subject matter has been described in connection with the preferred embodiments of the various figures, it is to be understood that other similar embodiments may be used or modifications and additions may be made to the described embodiments for performing the same function of the present subject matter without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present subject matter should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present subject matter should not be limited to specific embodiments described herein but instead construed most broadly.

What is claimed is:

1. A method for depositing funds of a negotiable instrument, the method executable by a computing device having a processor and memory, comprising:
    accessing a digital picture of the negotiable instrument, the digital picture captured with a digital camera in communication with the computing device;
    warping, by the processor, the digital picture to remove a distortion by:
        determining a histogram of the digital picture, wherein the histogram comprises a plurality of values of pixels of the digital picture;
        flooring at least one value of the plurality of values of the pixels;
        filtering at least a portion of the digital picture;
        determining at least one corner of the digital picture; and
        mapping the pixels of the digital picture into an output image based on the at least one determined corner;
    creating a digital image file with the computing device, wherein the digital image file comprises the output image;
    transmitting the digital image file; and
    transmitting, by the computing device, a request to deposit the funds of the negotiable instrument using the digital image file.

2. The method of claim 1, wherein the negotiable instrument comprises a check.

3. The method of claim 1, wherein the digital camera is integrated into a cellular telephone, a personal data assistant, or a web camera.

4. The method of claim 1, wherein mapping the pixels of the digital picture removes skew of the digital picture, aligns the digital picture, or enhances features of the digital picture.

5. The method of claim 1, further comprising extracting information from the digital picture.

6. The method of claim 5, wherein the information is magnetic ink character recognition information, an account number, a routing number, or a deposit amount.

7. A system for depositing funds of a negotiable instrument, comprising:
    a processor and a memory, the processor configured to access a digital picture of the negotiable instrument captured with a digital camera in communication with the processor and saved in the memory;
    wherein, to warp the digital picture to remove a distortion, the processor is further configured to:
        determine a histogram of the digital picture, wherein the histogram comprises a plurality of values of pixels of the digital picture;
        floor at least one value of the plurality of values of the pixels;
        filter at least a portion of the digital picture;
        determine at least one corner of the digital picture; and
        map the pixels of the digital picture into an output image based on the at least one determined corner; and wherein the processor is further configured to:
  create a digital image file with the output image;
  transmit the digital image file; and
  transmit a request to deposit the funds of the negotiable instrument using the digital image file.

8. The system of claim 7, wherein the negotiable instrument comprises a check.

9. The system of claim 7, wherein the digital camera is integrated into a cellular telephone, a personal data assistant, or a web camera.

10. The system of claim 7, wherein the processor is further configured to remove skew of the digital picture, align the digital picture, or enhance features of the digital picture.

11. The system of claim 7, further comprising at least one subsystem that extracts information from the digital picture.

12. The system of claim 11, wherein the information is magnetic ink character recognition information, an account number, a routing number, or a deposit amount.

13. A non-transitory computer-readable medium comprising computer-readable instructions executable by a processor and memory for depositing funds of a negotiable instrument, the computer-readable instructions comprising instructions to direct the processor to:
  access a digital picture of the negotiable instrument saved in the memory, the digital picture captured with a digital camera in communication with the processor;
  warp the digital picture to remove a distortion by directing the processor to:
    determine a histogram of the digital picture, wherein the histogram comprises a plurality of values of pixels of the digital picture;
    floor at least one value of the plurality of values of the pixels;
    filter at least a portion of the digital picture;
    determine at least one corner of the digital picture; and
    map the pixels of the digital picture into an output image based on the at least one determined corner;
  create a digital image file comprising the output image;
  transmit the digital image file; and
  transmit a request to deposit the funds of the negotiable instrument using the digital image file.

14. The computer-readable medium of claim 13, wherein the negotiable instrument comprises a check.

15. The computer-readable medium of claim 13, wherein the digital camera is integrated into a cellular telephone, a personal data assistant, or a web camera.

16. The computer-readable medium of claim 13, wherein the computer-readable instructions to map the pixels of the digital picture further comprise computer-readable instructions to direct the processor to remove skew of the digital picture, align the digital picture, or enhance features of the digital picture.

17. The computer-readable medium of claim 13, further comprising computer-readable instructions to extract information from the digital picture.

18. The computer-readable medium of claim 17, wherein the information is magnetic ink character recognition information, an account number, a routing number, or a deposit amount.

\* \* \* \* \*